(12) United States Patent
Kawai et al.

(10) Patent No.: US 7,017,395 B2
(45) Date of Patent: Mar. 28, 2006

(54) METHOD OF ESTIMATING FLOOR REACTION OF BIPEDAL MOVABLE BODY

(75) Inventors: Masakazu Kawai, Wako (JP); Yasushi Ikeuchi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 52 days.

(21) Appl. No.: 10/502,727

(22) PCT Filed: Jan. 22, 2003

(86) PCT No.: PCT/JP03/00533

§ 371 (c)(1),
(2), (4) Date: Jul. 27, 2004

(87) PCT Pub. No.: WO03/064117

PCT Pub. Date: Aug. 7, 2003

(65) Prior Publication Data

US 2005/0080590 A1    Apr. 14, 2005

(30) Foreign Application Priority Data

Jan. 28, 2002   (JP)   ............................. 2002-018789

(51) Int. Cl.
*G01M 1/00* (2006.01)
(52) U.S. Cl. .................................... 73/65.07
(58) Field of Classification Search ................ 73/760, 73/65.01, 65.07
See application file for complete search history.

(56) References Cited

U.S. PATENT DOCUMENTS

| | | | |
|---|---|---|---|
| 6,289,265 B1* | 9/2001 | Takenaka et al. | ........... 700/245 |
| 6,915,230 B1* | 7/2005 | Kawai et al. | ............... 702/139 |
| 2004/0167641 A1* | 8/2004 | Kawai et al. | ................. 700/63 |
| 2004/0206164 A1* | 10/2004 | Kawai et al. | .............. 73/65.07 |
| 2005/0075755 A1* | 4/2005 | Takenaka et al. | ........... 700/245 |
| 2005/0080590 A1* | 4/2005 | Kawai et al. | ............... 702/141 |

FOREIGN PATENT DOCUMENTS

| | | |
|---|---|---|
| JP | 2000-249570 | 9/2000 |
| JP | 2001-138271 | 5/2001 |
| JP | 2001-347476 | 12/2001 |
| JP | 2003-089083 | 3/2003 |

* cited by examiner

OTHER PUBLICATIONS

WO 03/002309 A1, Method of Estimating Floor Reactions of Bipedal Walking Body, and Method of Estimating Joint Moments of Bipedal Walking Body, Publication Date: Jan. 9, 2003.

*Primary Examiner*—Max Noori
(74) *Attorney, Agent, or Firm*—Rankin, Hill, Porter & Clark LLP

(57) ABSTRACT

It is determined whether the motion state of legs 2, 2 is a one-leg supporting state or a two-leg supporting state, and a total floor reaction force is estimated based on a motion equation of the center of gravity of a bipedal movable body 1. If the motion state of legs 2, 2 is the one-leg supporting state, the estimated value of the total floor reaction force is used as an estimated value of the floor reaction force on the leg 2 which is landed. When the motion state changes to the two-leg supporting state, a vertical component of the floor reaction force on the rear leg is estimated from the MP height of the front leg based on a predetermined correlation between the MP height of the front leg and the vertical component of the floor reaction force on the leg.

5 Claims, 15 Drawing Sheets

METHOD OF ESTIMATING FLOOR REACTION OF BIPEDAL MOVABLE BODY

TECHNICAL FIELD

The present invention relates to a method of estimating the vertical component of a floor reaction force acting on each leg of a bipedal movable body such as a human being, a bipedal walking robot, or the like, particularly while the bipedal movable body is in a two-leg supporting state in which both legs of the bipedal movable body are landed on the floor.

BACKGROUND ART

For controlling the operation of a walking assisting device for assisting a human being to walk or the movement of a bipedal walking robot, it is necessary to sequentially grasp a floor reaction force acting on a leg of the human being or the bipedal walking robot (specifically, a force acting on the landing area of the leg from the floor). Grasping the floor reaction force makes it possible to grasp a moment or the like that acts on joints of the leg of the bipedal movable body, and also to determine a desired assistive force for the walking assisting device or a desired drive torque for each joint of the bipedal walking robot based on the grasped moment or the like.

One known process of grasping the floor reaction force is disclosed in Japanese laid-open patent publication No. 2000-249570, for example. According to the disclosed process, since the waveform of time-depending changes in the floor reaction force on each leg periodically changes at the time the bipedal movable body walks steadily, the floor reaction force on each leg is grasped as a combined value (linear combination) of trigonometric functions having respective different periods which are 1/n (n=1, 2, . . . ) of the walking period. The weighting coefficient of each of the trigonometric functions at the time the trigonometric functions are combined is of a predetermined value for each bipedal movable body or a value produced by adjusting the predetermined value depending on the terrain.

According to the above process, since the floor reaction force on each leg is grasped for one step or a plurality of steps of the bipedal movable body, it is difficult to grasp the floor reaction force accurately if the gait of the bipedal movable body changes sequentially. For increasing the accuracy of the grasped floor reaction force, the weighting coefficients of the trigonometric functions have to be established for each bipedal movable body or have to be adjusted depending on the terrain or the like. Therefore, it is difficult to grasp the floor reaction force accurately by reducing the effect of the environment in which the bipedal movable body moves and the difference between individual units of the bipedal movable body.

Some known bipedal walking robots have force sensors such as six-axis force sensors or the like mounted on the ankle and foot of each leg, and grasp a floor reaction force based on output signals from those force sensors. According to a known process, a bipedal walking robot is caused to walk on a force plate laid on the floor, and a floor reaction force is grasped from an output signal from the force plate.

If floor reaction forces on the legs of a human being are to be recognized based on output signals from force sensors, then since the force sensors need to be mounted on the ankles and feet of the human being, the force sensors tend to present an obstacle to the walking of the human being in the normal living environment. Use of the force plate is only effective to grasp the floor reaction plate only in the environment in which the force plate is used.

In order to eliminate the above drawbacks, the applicant of the present application has proposed a method of estimating a floor reaction force as disclosed in Japanese patent application No. 2002-39201 or PCT/JP02/06467. The principles of the proposed method will be described below with reference to FIGS. 1(a) and 1(b). Motion states of a bipedal movable body (motion states of legs during walking) include a one-leg supporting state in which, as shown in FIG. 1(a), only one (the forward leg in the direction of travel in the figure) of the legs 2, 2 of a bipedal movable body 1 is landed, and a two-leg supporting state in which, as shown in FIG. 1(b), both the legs 2, 2 are landed.

If a total floor reaction force which acts on the legs 2, 2 from a floor A is represented by F, then the total floor reaction force F is equal to a floor reaction force acting on the landed leg 2 in the one-leg supporting state shown in FIG. 1(a), and is equal to a combination of floor reaction forces Ff, Fr acting respectively on the legs 2, 2 in the two-leg supporting state shown in FIG. 1(b). In an absolute coordinate system Cf that is fixed with respect to the floor A on which the bipedal movable body 1 moves, it is assumed that an acceleration a of the center G0 of gravity of the bipedal movable body 1 has components ax, az respectively in an X-axis direction (horizontal direction of travel of the bipedal movable body 2) and a Z-axis direction (vertical direction), and the total floor reaction force F acting on the bipedal movable body 1 has components Fx, Fz respectively in the X-axis direction and the Z-axis direction. The dynamic equation of the center G0 of gravity (specifically, the dynamic equation with respect to the translation of the center G0 of gravity) is expressed as the following equation (1):

$$^T(Fx, Fz-M \cdot g) = M \cdot {}^T(ax, az) \qquad (1)$$

(where M: the weight of the bipedal movable body, g: the gravitational acceleration)

The parentheses $^T(\ ,\ )$ on both sides of the equation (1) represent a two-element vector. In the present specification, the notation $^T(\ ,\ )$ expresses a vector.

The dynamic equation of the center G0 of gravity thus serves as a relational expression indicating that the product of the acceleration a of the center G0 of gravity and the weight M of the bipedal movable body 1 is equal to a combination of the gravitational force (=M·g) acting on the center G0 of gravity and the total floor reaction force F.

Therefore, if the acceleration $a = {}^T(ax, az)$ of the center G0 of gravity of the bipedal movable body 1 is grasped, then an estimated value of the total floor reaction force $F = {}^T(Fx, Fz)$ can be obtained according to the following equation (2), using the acceleration a, the value of the weight M of the bipedal movable body 1, and the value of the gravitational acceleration g:

$$^T(Fx, Fz) = M \cdot {}^T(ax, az+g) \qquad (2)$$

In the one-leg supporting state shown in FIG. 1(a), since the floor reaction force acting on the single leg 2 that is being landed is equal to the total floor reaction force F, an estimated value of the total floor reaction force F acting on the single leg 2 can be obtained according to the equation (2).

The weight M which is required to obtain the estimated value of the floor reaction force F can be grasped in advance by measurements or the like. The position of the center G0 of gravity and the acceleration a can sequentially be grasped by a known process using the outputs of sensors such as sensors for detecting the bent angles (rotational angles) of the joints of the bipedal movable body 1, acceleration sensors, and gyrosensors, as described in detail later on.

In the two-leg supporting state shown in FIG. 1(b), the floor reaction force Ff on the front leg 2 has components Ffx, Ffz in the respective X- and Z-axis directions, the floor reaction force Fr on the rear leg 2 has components Frx, Frz in the respective X- and Z-axis directions. Th total floor reaction force F has components Fx, Fz expressed by Ffx+Frx, Ffz+Frz, respectively, in the respective X- and Z-axis directions, and the dynamic equation of the center G0 of gravity is expressed as the following equation (3):

$$^T(Ffx+Frx, Ffz+Frz-M \cdot g) = M \cdot {}^T(ax, az) \quad (3)$$

In the two-leg supporting state, it is assumed that, as shown in FIG. 1(b), the floor reaction forces Ff, Fr on the respective legs 2, 2 act from particular regions 12f, 12r of the legs 2, 2 (e.g., ancles) near the lower ends thereof toward the center G0 of gravity of the bipedal movable body 1. In this case, between the positions of the particular regions 12f, 12r of the legs 2, 2 and the floor reaction forces Ff, Fr acting on the respective legs 2, 2, there is satisfied a certain relational expression, i.e., a relational expression indicating that the orientations of line segments interconnecting the center G0 of gravity and the particular regions 12f, 12r of the legs 2, 2 (the orientations of positional vectors of the particular regions 12f, 12r with respect to the center G0 of gravity) are equal to the orientations of the floor reaction forces Ff, Fr acting on the respective legs 2, 2.

Specifically, referring to FIG. 1(b), if the position of the center G0 of gravity has coordinates (Xg, Zg), the position of the particular region 12f of the front leg 2 has coordinates (Xf, Zf), and the position of the particular region 12r of the rear leg 2 has coordinates (Xr, Zr) in the absolute coordinate system Cf, then the above relational expression is given as the following equation (4):

$$(Zf-Zg)/(Xf-Xg) = Ffz/Ffx$$

$$(Zr-Zg)/(Xr-Xg) = Frz/Frx \quad (4)$$

From the equation (4) and the equation (3), the following equations (5), (5') are obtained:

$$Ffx = M \cdot \{\Delta Xf \cdot (\Delta Zr \cdot ax - \Delta Xr \cdot az - \Delta Xr \cdot g)\}/(\Delta Xf \cdot \Delta Zr - \Delta Xr \cdot \Delta Zf)$$

$$Frx = M \cdot \{\Delta Xr \cdot (-\Delta Zf \cdot ax + \Delta Xf \cdot az + \Delta Xf \cdot g)\}/(\Delta Xf \cdot \Delta Zr - \Delta Xr \cdot \Delta Zf) \quad (5)$$

$$Ffz = M \cdot \{\Delta Zf \cdot (\Delta Zr \cdot ax - \Delta Xr \cdot az - \Delta Xr \cdot g)\}/(\Delta Xf \cdot \Delta Zr - \Delta Xr \cdot \Delta Zf)$$

$$Frz = M \cdot \{\Delta Zr \cdot (-\Delta Zf \cdot ax + \Delta Xf \cdot az + \Delta Xf \cdot g)\}/(\Delta Xf \cdot \Delta Zr - \Delta Xr \cdot \Delta Zf) \quad (5')$$

(where $\Delta Zf = Xf - Xg$, $\Delta Zf = Zf - Zg$, $\Delta Xr = Xr - Xg$, $\Delta Zr = Zr - Zg$)

Therefore, if the acceleration $a = {}^T(ax, az)$ of the center G0 of gravity of the bipedal movable body 1 is grasped and the positions (which are expressed by $\Delta Xf$, $\Delta Zf$, $\Delta Xr$, $\Delta Zr$ in the equations (5), (5')) of the particular regions 12f, 12r of the legs 2, 2 with respect to the center G0 of gravity of the bipedal movable body 1 are grasped, then it is possible to obtain estimated values of the floor reaction forces $Ff = {}^T(Ffx, Ffz)$, $Fr = {}^T(Frx, Frz)$ on the respective legs 2 according to the equations (5), (5'), using the acceleration a, the positions of the particular regions 12f, 12r, the value of the weight M of the bipedal movable body 1, and the value of the gravitational acceleration g.

In this case, the weight M which is required to obtain the estimated values of the floor reaction forces Ff, Fr can be grasped in advance by measurements or the like. The acceleration a of the center G0 of gravity, the position of the center G0 of gravity, and the positions of the particular regions 12f, 12r with respect to the center G0 of gravity can sequentially be grasped by a known process using the outputs of sensors such as sensors for detecting the bent angles (rotational angles) of the joints of the bipedal movable body 1, acceleration sensors, and gyrosensors, as described in detail later on.

It has been found that the estimated values of the vertical components Ffz, Frz of the floor reaction forces on the legs in the two-leg supporting state, which are determined by the method of the prior application are not necessarily of satisfactory accuracy. This is because the floor reaction forces Ff, Fr on the respective legs do not necessarily act from the particular regions 12f, 12r of the legs 2, 2 toward the center G0 of gravity of the bipedal movable body 1. The estimated values of the vertical components of the floor reaction forces which become large under the influence of the weight of the bipedal movable body 1 tend to suffer a larger error than their components in the direction of travel.

In view of the above shortcomings, it is a task of the present invention to provide a floor reaction force estimating method which is capable of grasping the vertical component of a floor reaction force acting on each leg in a two-leg supporting state, accurately in real-time according to a relatively simple process, the floor reaction force estimating method being particularly suitable for grasping a floor reaction force on a human being as a bipedal mobile body.

DISCLOSURE OF THE INVENTION

In order to solve the above problems, a method of estimating a floor reaction force of a bipedal movable body, i.e., a method of estimating a vertical component of a floor reaction force acting on each leg of the bipedal movable body while the bipedal movable body is in a two-leg supporting state in which both legs of the bipedal movable body are landed on a floor, comprises a first step of sequentially determining the position of the center of gravity of the bipedal movable body and sequentially determining the acceleration of the center of gravity in an absolute coordinate system fixed with respect to the floor using time-series data of the position of the center of gravity, a second step of sequentially determining an estimated value of a total floor reaction force based on a motion equation of the center of gravity which is expressed by the weight of the bipedal movable body, the gravitational acceleration, an acceleration of the center of gravity, and the total floor reaction force which is a combination of floor reaction forces acting on the legs, and a third step of sequentially determining the position, from the surface of the floor, of a predetermined particular region of a foot of at least a front one of the legs which is positioned forward in the direction of travel of the bipedal movable body in the two-leg supporting state, wherein when the bipedal movable body is in the two-leg supporting state, an estimated value of the vertical component of the floor reaction force acting on the rear leg is sequentially determined using the position, determined in the third step, from the surface of the floor, of the particular region of the foot of the front leg, based on a predetermined correlation between the vertical component of the floor reaction force acting on a rear one of the legs which is positioned rearward in the direction of travel of the bipedal movable body, and the position, from the surface of the floor, of the particular region of the foot of the front leg, and the determined estimated value of the vertical component of the floor reaction force acting on the rear leg is subtracted from the estimated value, determined in the second step, of the vertical component of the total floor reaction force to sequentially determine an estimated value of the vertical component of the floor reaction force acting on the front leg (first invention).

The inventor of the present application has found, as a result of intensive efforts, that the vertical component of the floor reaction force acting on the rear leg in the two-leg supporting state changes with a strong correlation to changes in the position, from the surface of the floor, of a particular region (e.g., a metatarsophalangeal joint) of the foot of the front leg after the bipedal movable body changes to the two-leg supporting state with the heel of the foot of the front leg being landed on the floor. If the correlation between the vertical component of the floor reaction force acting on the rear leg and the position, from the surface of the floor, of the particular region of the foot of the front leg is examined in advance by various experiments, simulations, or the like, then the vertical component of the floor reaction force acting on the rear leg can be estimated using the position, from the surface of the floor, of the particular region of the foot of the front leg, based on the correlation in accordance with the present invention. Since the combination of the floor reaction force acting on the rear leg and the floor reaction force acting on the front leg is the total floor reaction force, the estimated value of the vertical component of the floor reaction force acting on the front leg can be determined by subtracting the estimated value of the vertical component of the floor reaction force acting on the rear leg, which is determined based on the above correlation, from the estimated value of the vertical component of the total floor reaction force.

The estimated values of the horizontal components (the components in the direction of travel of the bipedal movable body) of the floor reaction forces acting on the front and rear legs may be determined by a suitable process, e.g., according to the above equation (5) as with the prior application.

The estimated value of the total floor reaction force according to the present invention is determined according to the same process as with the prior application. The weight of the bipedal movable body which is required to determine the estimated value of the total floor reaction force may be grasped by measurements or the like. The position and acceleration of the center of gravity of the bipedal movable body can be grasped in real-time using the data of outputs from sensors which are relatively small in size and can easily be mounted on the bipedal movable body, such as sensors (potentiometers or the like) for detecting bent angles (rotational angles) of the joints of the bipedal movable body, acceleration sensors, gyrosensors, or the like. The position of the particular region of the foot from the surface of the floor can also be grasped in real-time by a simple acceleration sensor or the like for measuring inclinations which is installed on footwear or the like.

With the method of estimating a floor reaction force according to the present invention, therefore, the floor reaction force can be grasped in real-time according to a relatively simple process without the need for a force sensor mounted on an ankle or foot of the bipedal movable body or a force plate.

In the first embodiment, the particular region of the foot preferably comprises a metatarsophalangeal joint (second invention). If the particular region comprises a metatarsophalangeal joint, then the correlation between the vertical component of the floor reaction force acting on the rear leg in the two-leg supporting state and the position, from the surface of the floor, of the particular region (metatarsophalangeal joint) of the foot of the front leg is highly increased. Therefore, the accuracy with which to estimate the vertical component of the floor reaction force is increased.

According to the first and second inventions, the estimated values of the horizontal components of the floor reaction forces acting on the rear and front legs can be determined in the same manner as with the prior application, for example, as described above. In this case, the method may further comprise the step of sequentially determining an estimated value of the horizontal component of the floor reaction force acting on each of the legs based on a motion equation (corresponding to the above equation (3)) of the center of gravity and a relational expression (corresponding to the above equation (4)) between the position of a predetermined second particular region of a lower portion of each of the legs with respect to the center of gravity and the floor reaction force acting on each of the legs, which relational expression is determined on the assumption that the floor reaction force acting on each of the legs acts from the second particular region toward the center of gravity, when the bipedal movable body is in the two-leg supporting state (third invention). In this case, the second particular region preferably comprises an ankle of each of the legs (fourth invention).

With the above arrangement, the estimated value of the horizontal components of the floor reaction forces on the legs in the two-leg supporting state can be determined according to the equation (5).

According to the first and second inventions, alternatively, the estimated value of the horizontal components of the floor reaction forces on the legs can be determined as follows: The method may further comprise the step of sequentially determining an estimated value of the horizontal component of the floor reaction force acting on the rear leg based on the horizontal component of the floor reaction force acting on the rear leg and a predetermined correlation between an elapsed time from the start of the two-leg supporting state and a traveling speed of the bipedal movable body, and the step of subtracting the determined estimated value of the horizontal component of the floor reaction force acting on the rear leg from the estimated value of the horizontal component of the total floor reaction force determined in the second step thereby to determine an estimated value of the horizontal component of the floor reaction force acting on the front leg (fifth invention).

Specifically, according to the finding of the inventor of the present application, in the two-leg supporting state, the horizontal component of the floor reaction force acting on the rear leg (the component in the direction of travel of the bipedal movable body) in particular is correlated to the elapsed time from the start of the two-leg supporting state and the traveling speed of the bipedal movable body. Thereby, if the correlation is examined in advance by various experiments, simulations, or the like, then the estimated value of the horizontal component of the floor reaction force acting on the rear leg can be determined based on the correlation as with the fifth invention. Since the estimated value of the total floor reaction force is determined in the second step, the estimated value of the horizontal component of the floor reaction force on the front leg can be determined by subtracting the estimated value of the horizontal component of the floor reaction force on the rear leg from the horizontal component of the total floor reaction force.

According to the first through fifth inventions, in the one-leg supporting state, the floor reaction forces may be estimated in the same manner as with the prior application. Specifically, in the one-leg supporting state, the estimated value of the total floor reaction force which is determined in the second step may be obtained directly as the estimated value of the floor reaction force acting on the leg which is landed on the floor.

BEST MODE FOR CARRYING OUT THE INVENTION

An embodiment of the present invention will be described below with reference to FIGS. 2 through 9.

The present embodiment is an embodiment in which a method of estimating a floor reaction force according to the present invention is applied to a human being as a bipedal movable body.

Figure 2:
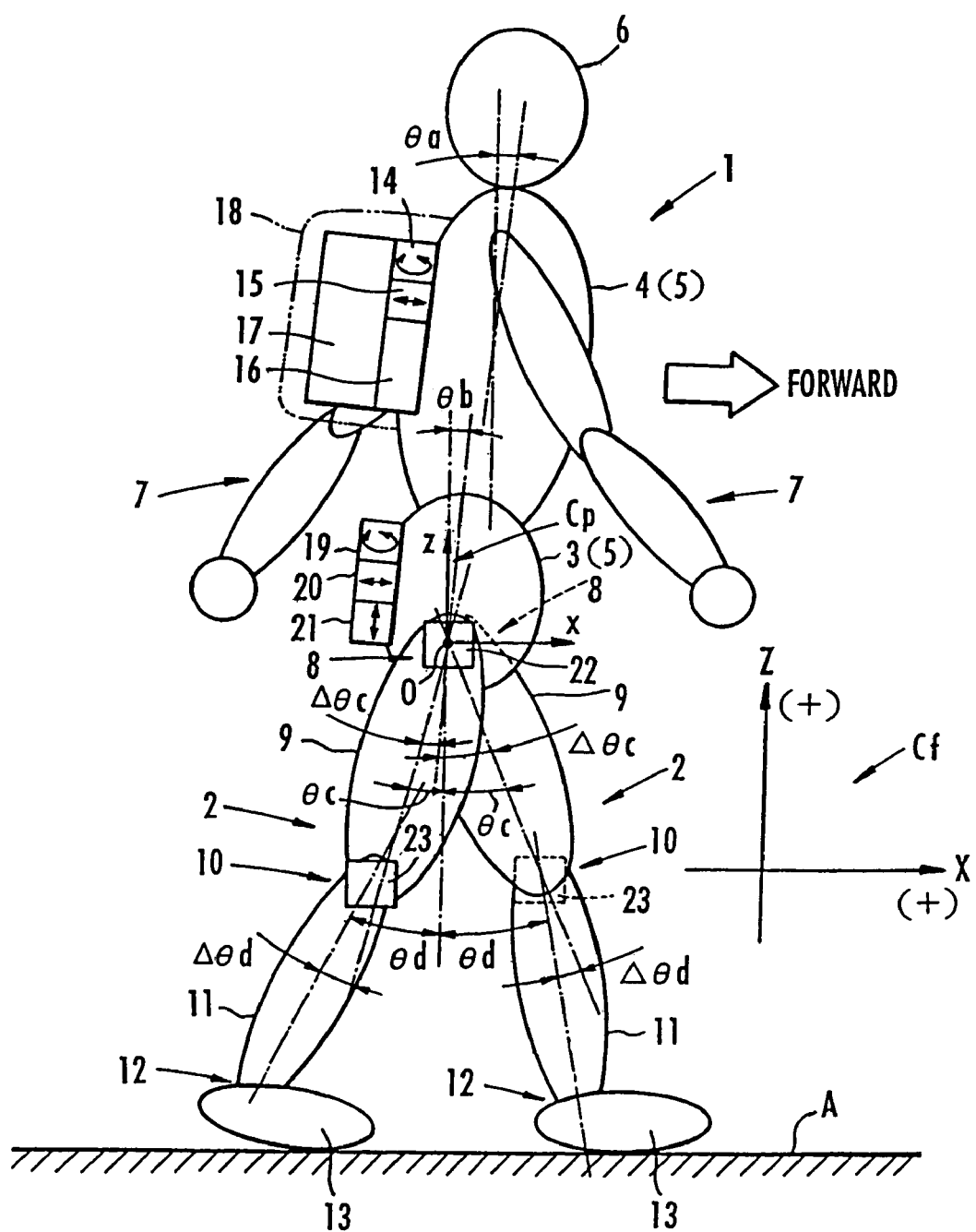
FIG. 2 is a schematic view of a human being as a bipedal movable body according to an embodiment of the present invention and an apparatus equipped on the human being.
Figure 3:
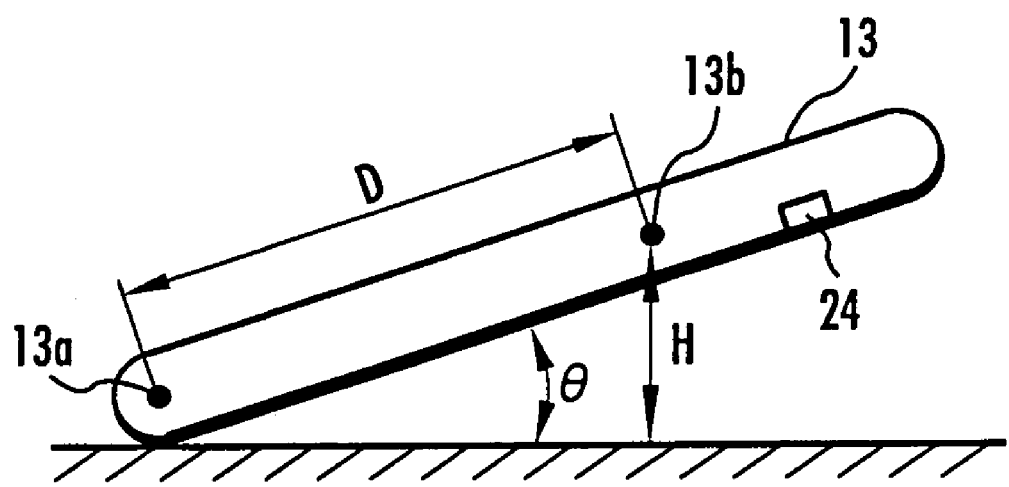
FIG. 3 is a view illustrative of the principles of measuring the position (MP height) of a particular region of a foot from a floor surface.

As schematically shown in FIG. 2, a human being 1 roughly has a pair of left and right legs 2, 2, a torso 5 comprising a hip 3 and a chest 4, a head 6, and a pair of left and right arms 7, 7. The torso 5 is supported on the legs 2, 2 with the hip 3 coupled to the legs 2, 2 by a pair of respective left and right hip joints 8, 8. The chest 4 of the torso 5 is disposed on an upper portion of the hip 3 so as to be tiltable forwardly of the human being 1 with respect to the hip 3. The arms 7, 7 extend from left and right upper sides of the chest 4, and the head 6 is supported on an upper end of the chest 4.

Each of the legs 2, 2 has a thigh 9 extending from the hip joint 8 and a lower thigh 11 extending from a distal end of the thigh 9 through a knee joint 10. A foot 13 is coupled to a distal end of the lower thigh 11 by an ankle (ankle joint) 12.

In the present embodiment, the human being 1 is equipped with an apparatus, to be described below, for estimating a floor reaction force acting on each of the legs 2 of the human being 1 and also estimating a moment acting on the knee joints 10 and the hip joint 8.

On the chest 4 of the torso 5, there are mounted a gyrosensor 14 (hereinafter referred to as "chest gyrosensor 14") for generating an output depending on an angular velocity due to an inclination of the chest 4, an acceleration sensor 15 (hereinafter referred to as "chest anteroposterior acceleration sensor 15") for generating an output depending on an acceleration in the anteroposterior direction of the chest 4, a processing device 16 comprising a CPU, RAM, a ROM, etc., and a battery 17 serving as a power supply for the processing device 16, etc. The chest gyrosensor 14, the chest anteroposterior acceleration sensor 15, the processing device 16, and the battery 17 are housed in a shoulder-bag-shaped housing 18 that is fixed to the chest 4 by a belt or the like (not shown), and hence are integrally secured to the chest 4 by the housing 18.

Specifically, the acceleration represented by the output of the chest acceleration sensor 15 is an acceleration in the anteroposterior direction as a direction on a horizontal cross section of the chest 4 (a direction perpendicular to the axis of the chest 4). When the human being 1 is standing in an upstanding posture on a flat surface, the acceleration represented by the output of the chest acceleration sensor 15 is an acceleration in the anteroposterior horizontal direction (the direction of the X-axis of the absolute coordinate system shown in FIG. 2). When the hip 3 or the chest 4 is tilted from the vertical direction (the direction of the Z-axis of the absolute coordinate system shown in FIG. 2), the acceleration represented by the output of the chest acceleration sensor 15 is an acceleration in a direction which is tilted to the horizontal direction by the angle of inclination of the chest 4 with respect to the vertical direction.

On the hip 3 of the torso 5, there are fixedly mounted by a fixing means such as a belt or the like (not shown) a gyrosensor 19 (hereinafter referred to as "hip gyrosensor 19") for generating an output depending on an angular velocity due to an inclination of the hip 3, an acceleration sensor 20 (hereinafter referred to as "hip anteroposterior acceleration sensor 20") for generating an output depending on an acceleration in the anteroposterior direction of the chip 3, and an acceleration sensor 21 (hereinafter referred to as "hip vertical acceleration sensor 21") for generating an output depending on an acceleration in the vertical direction of the hip 3.

Specifically, as with the chest anteroposterior acceleration sensor 15, the hip anteroposterior acceleration sensor 20 is a sensor for detecting an acceleration in the anteroposterior direction as a direction on a horizontal cross section of the hip 3 (a direction perpendicular to the axis of the hip 3). The hip vertical acceleration sensor 21 is a sensor for detecting an acceleration in the vertical direction along the axis of the hip 3 (which acceleration is perpendicular to the acceleration detected by the hip anteroposterior acceleration sensor 20). The hip anteroposterior acceleration sensor 20 and the hip vertical acceleration sensor 21 may be of a one-piece structure comprising a biaxial acceleration sensor.

On the hip joint 8 and the knee joint 10 of each leg 2, there are mounted a knee joint angle sensor 22 and a hip joint angle sensor 23 for generating outputs depending on respective bent angles $\Delta\theta c$, $\Delta\theta d$. Only the hip joint angle sensor 22 associated with the hip joint 8 of the leg 2 nearer to the viewer of FIG. 2 (on the right side of the human being 1 as it faces forward) is shown. Actually, the same hip joint angle sensor 22 as the hip joint angle sensor 22 nearer to the viewer is mounted on the hip joint 8 of the other leg 2 (on the left side of the human being 1 as it faces forward).

These angle sensors 22, 23 each comprise a potentiometer, for example, and are mounted on the legs 2 by means of bands or the like (not shown). The bent angle $\Delta\theta c$ detected by each hip joint angle sensor 22 is specifically an angle through which the thigh 9 of the leg 2 turns about the hip joint 8 with respect to the hip 3 (about the axis of the hip joint 8 in the lateral direction of the human being 1), from a reference representing a predetermined postural relationship between the hip 3 and the thigh 9 (e.g., a postural relationship in which the axis of the hip 3 and the axis of the thigh 9 are substantially parallel to each other, such as an upstanding postural state of the human being 1). Similarly, the bent angle $\Delta\theta d$ detected by each knee joint angle sensor 23 is an angle through which the lower thigh 11 turns about the knee joint 10 with respect to the thigh 9 (about the axis of the knee joint 10 in the lateral direction of the human being 1), from a reference representing a predetermined postural relationship between the thigh 9 and the lower thigh 11 (e.g., a postural relationship in which the axis of the thigh 9 and the axis of the lower thigh 11 are substantially parallel to each other).

There is also provided a sensor for measuring the position of a particular region of the foot 13 of each leg 2, e.g., a metatarsophalangeal joint, from the floor surface (hereinafter referred to as "MP height"). The sensor will be described in detail below with reference to FIG. 3. A portion of a foot 13 from a heel 13a to a metatarsophalangeal joint 13b is assumed to be a rigid body, and the MP height H is given as $H = D \sin\theta$ where D represents the distance from the heel 13a to the metatarsophalangeal joint 13b and $\theta$ the angle of inclination of the foot 13 from the floor surface. If an acceleration sensor 24 for detecting an acceleration in the longitudinal direction of the foot 13 is installed on footwear or the like, the angle $\theta$ is calculated by the equation of $\theta = \sin^{-1}(gs/g)$ where gs represents an acceleration measured by the acceleration sensor 24 and g the gravitational acceleration, and the MP height H is calculated using the angle $\theta$. In the two-leg supporting state, the heel position of the front leg 2 in the direction of travel of the human body 1 is not accelerated, and the acceleration sensor 24 accurately detects an acceleration depending on the angle $\theta$ of inclination of the foot 13. Therefore, the angle $\theta$ of inclination of the foot 13 and hence the MP height H are accurately measured by the acceleration sensor 24. The acceleration sensor 24 should desirably be installed at a position near the toe spaced from the heel in order to reduce shocks that are applied to the acceleration sensor 24 when the foot 13 is landed.

The sensors 14, 15, 19 through 24 are connected to the processing device 16 by signal lines (not shown) for applying their outputs to the processing device 16.

Figure 1:
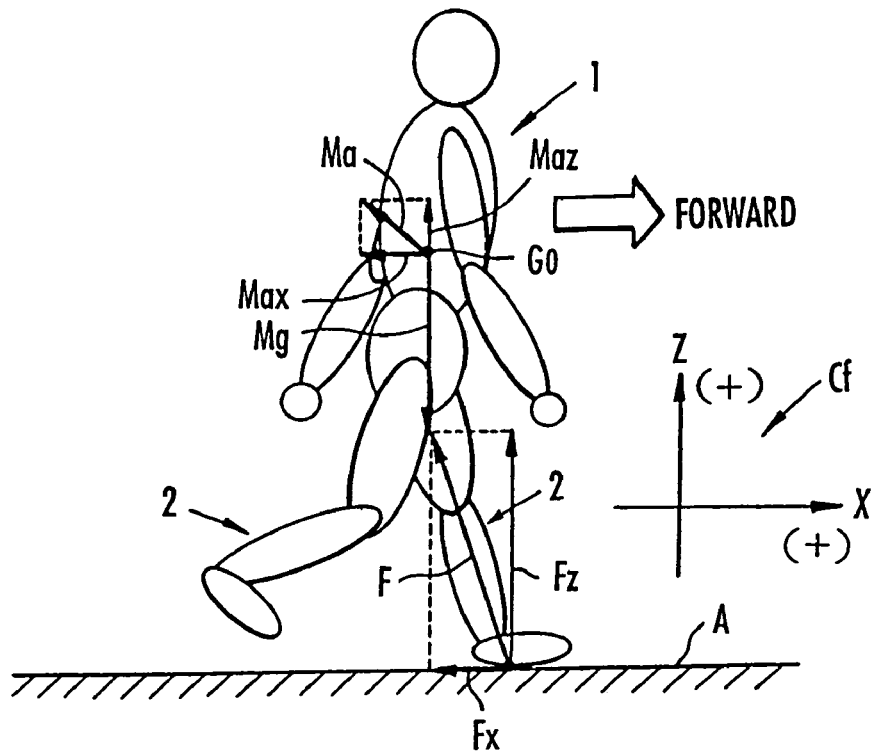
FIGS. 1(a) and 1(b) are views illustrative of the basic principles of a method of estimating a floor reaction force disclosed in a prior application.
Figure 1:
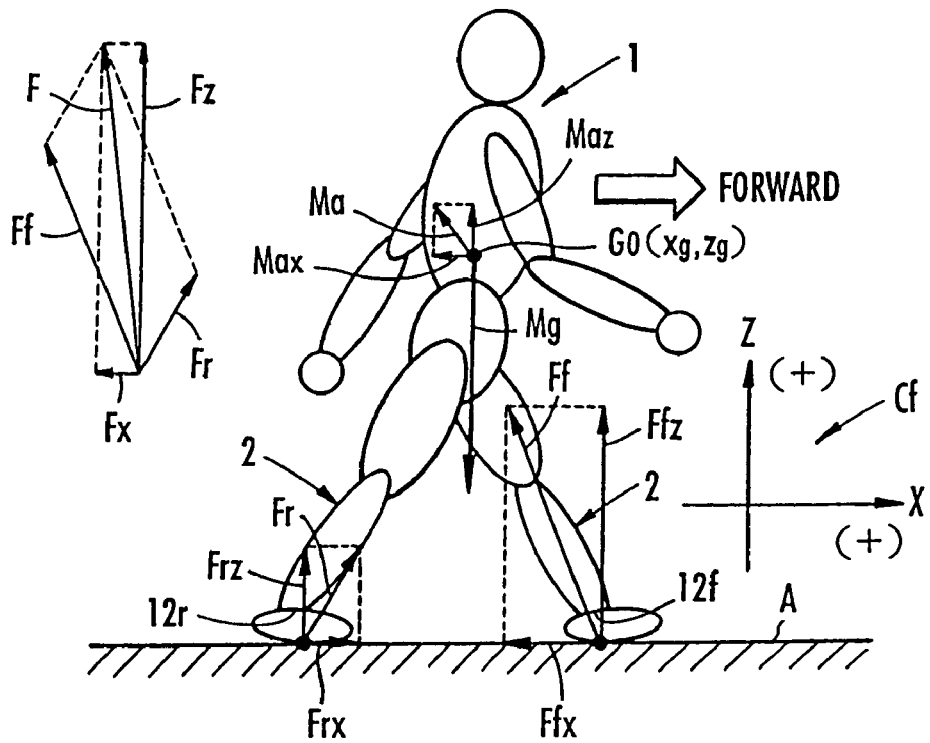
Figure 4:
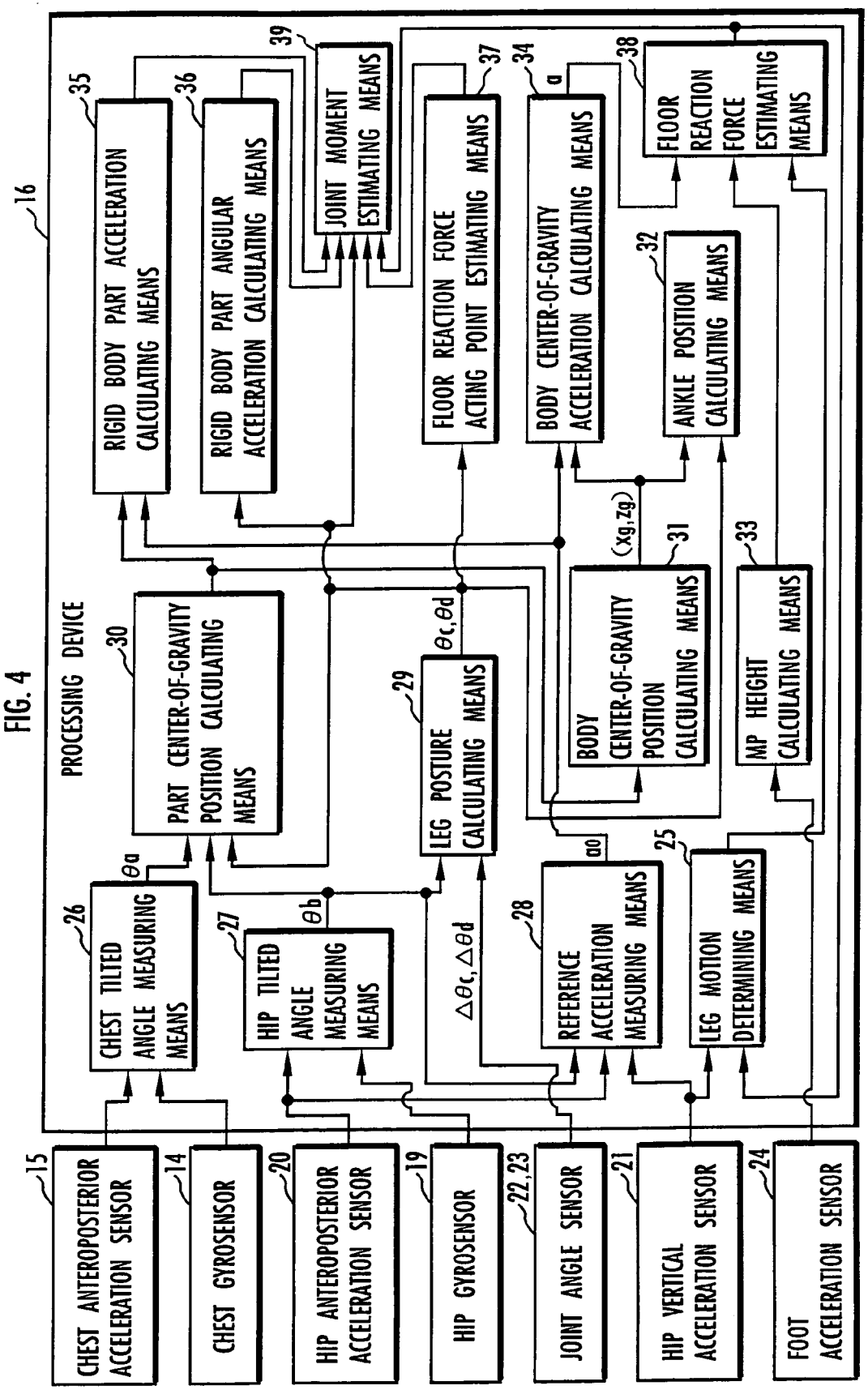
FIG. 4 is a block diagram illustrative of the functions of a processing device of the apparatus shown in FIG. 2.

The processing device 16 has functional means as shown in FIG. 4. Specifically, the processing device 16 has a leg motion determining means 25 for determining whether the legs 2, 2 of the human being 1 are in the one-leg supporting state (the state shown in FIG. 1(a)) or the two-leg supporting state (the state shown in FIG. 1(b)), using the detected data from the hip vertical acceleration sensor 21 and the data of estimated values of floor reaction forces of the legs 2 determined by a floor reaction force estimating means 38 to be described later. The processing device 16 also has a chest tilted angle measuring means 26 for measuring a tilted angle $\theta a$ (specifically, a tilted angle $\theta a$ with respect to the vertical direction, for example, see FIG. 2) in the absolute coordinate system Cf of the chest 4, using the detected data from the chest anteroposterior acceleration sensor 15 and the chest gyrosensor 14, and a hip tilted angle measuring means 27 for measuring a tilted angle $\theta b$ (specifically, a tilted angle $\theta b$ with respect to the vertical direction, for example, see FIG. 2) in the absolute coordinate system Cf of the hip 3, using the detected data from the hip anteroposterior acceleration sensor 20 and the hip gyrosensor 19.

Furthermore, the processing device 16 has a reference acceleration measuring means 28 for determining an acceleration (translational acceleration) $a_0 = {}^T(a0x, a0z)$ in the absolute coordinate system Cf of the origin O of a body coordinate system Cp (the xz coordinates in FIG. 2) that is established on the hip 3 as shown in FIG. 2 as a reference point for the human being 1 according to the present embodiment, using the detected data from the hip anteroposterior acceleration sensor 20 and the hip vertical acceleration sensor 21 and the data of the tilted angle $\theta b$ of the hip 3 which is measured by the hip tilted angle measuring means 27. Specifically, the body coordinate system Cp is a coordinate system having an origin O at the middle point of a line interconnecting the centers of the left and right hip joints 8, 8 of the human being 1, for example, and a z-axis extending in the vertical direction and an x-axis extending in the horizontal direction oriented forward of the human being 1 (a coordinate system whose three axes have the same directions as the absolute coordinate system Cf).

Furthermore, the processing device 16 has a leg posture calculating means 29 for determining respective tilted angles $\theta c$, $\theta d$ of the thigh 9 and the lower thigh 11 of each leg 2 in the absolute coordinate system Cf (specifically, tilted angles $\theta c$, $\theta d$ with respect to the vertical direction, for example, see FIG. 2), using the detected data from the knee joint angle sensor 22 and the hip joint angle sensor 23 of each leg and the data of the tilted angle $\theta b$ of the hip 3 which is measured by the hip tilted angle measuring means 27.

Furthermore, the processing device 16 has a part center-of-gravity position calculating means 30 for determining the positions of the centers of gravity of various rigid body equivalent parts of the human body 1 which corresponds to a rigid body link model to be described later (more specifically, the positions of the centers of gravity of various rigid body equivalent parts in the body coordinate system Cp), using the data of the tilted angle $\theta a$ of the chest 4, the tilted angle $\theta b$ of the hip 3, the tilted angle $\theta c$ of the thigh 9 of each leg 2, and the tilted angle $\theta d$ of the lower thigh 11 of each leg which are obtained from the chest tilted angle measuring means 26, the hip tilted angle measuring means 27, and the leg posture calculating means 29, a body center-of-gravity position calculating means 31 for determining the position of the center of gravity of the entire human being 1 in the body coordinate system Cp, using the data of the positions of the centers of gravity of the rigid body equivalent parts, an ankle position calculating means 32 for determining the position with respect to the body center G0 of gravity of the ankle 12 of each leg 2 (specifically, ΔXf, ΔZf, ΔXr, ΔZr in the equation (5)) as the particular region of each leg 2 in the present embodiment, using the data of the position of the center G0 of gravity of the entire human being 1 (see FIG. 1, hereinafter referred to as "body center G0 of gravity) and the data of the tilted angles θc, θd of the of the thigh 9 and the lower thigh 11 of each leg 2 from the leg posture calculating means 29, an MP height calculating means 33 for determining the MP height H using the detected data from the foot acceleration sensor 24, and a body center-of-gravity acceleration calculating means 34 for determining the acceleration $a=^{T}(ax, az)$ (see FIG. 1) of the body center G0 of gravity in the absolute coordinate system Gf, using the data of the position of the body center of gravity from the body center-of-gravity position calculating means 31 and the data of the acceleration a0 of the origin O of the body coordinate system Cp from the hip tilted angle measuring means 27.

Furthermore, the processing device 16 has a rigid body part acceleration calculating means 35 for determining accelerations (translational accelerations) of the respective centers of gravity of the thigh 9 and the lower thigh 11 of each leg 2 in the absolute coordinate system Cf, using the positions of the centers of gravity of the rigid body equivalent parts of the human body 1 (specifically, the positions of the centers of gravity of the rigid body equivalent parts of the legs 2) from the part center-of-gravity position calculating means 30 and the data of the acceleration a0 of the origin O of the body coordinate system Cp from the reference acceleration measuring means 28, a rigid body part angular acceleration calculating means 36 for determining angular accelerations of the thigh 9 and the lower thigh 11 of each leg 2 in the absolute coordinate system Cf, using the data of the tilted angles θc, θd of the of the thigh 9 and the lower thigh 11 of each leg 2 from the leg posture calculating means 29, and a floor reaction force acting point estimating means 37 for estimating the position of a floor reaction force acting point of each leg 2 which is landed, using the data of the tilted angle θc of the thigh 9, for example, of the tilted angles θc, θd of the of the thigh 9 and the lower thigh 11 of each leg 2, 2 from the reference acceleration measuring means 28.

Furthermore, the processing device 16 has a floor reaction force estimating means 38 for determining an estimated value of a floor reaction force acting on each leg 2, using the data of the acceleration a of the body center of gravity from the body center-of-gravity acceleration calculating means 34, the data of the ankle position from the ankle position calculating means 32, the data of the MP height H from the MP height calculating means 33, and the data of the judged motion states of the legs 2 from the leg motion determining means 25, and a joint moment estimating means 39 for estimating moments acting on the knee joint 10 and the hip joint 8 of each leg 2, using the data of the estimated value of the floor reaction force, the data of the accelerations of the centers of gravity of the thigh 9 and the lower thigh 11 of each leg 2 from the rigid body part acceleration calculating means 35, the data of the angular accelerations of the thigh 9 and the lower thigh 11 of each leg 2 from the rigid body part angular acceleration calculating means 36, the data of the estimated position of the floor reaction force acting point from the floor reaction force acting point estimating means 37, and the data of the tilted angles θc, θd of the of the thigh 9 and the lower thigh 11 of each leg 2, 2 from the leg posture calculating means 29.

Operation of the present embodiment, together with the detailed processing of the means of the processing device 16 described above, will be described below.

In the present embodiment, when a power supply switch, not shown, of the processing device 16 is turned on while both the legs 2, 2 are being landed at the time the human being 1 is to move the legs 2 for walking or the like, the processing of the processing device 16 is sequentially executed in each given cycle time as described below, for sequentially determining estimated values of floor reaction forces acting on the respective legs 2.

First, the processing device 16 executes the processing of the leg motion determining means 25. In the processing of the leg motion determining means 25, the detected data of an upward acceleration of the hip 3 from the hip vertical acceleration sensor 21 is compared with a predetermined threshold in each cycle time. When the detected value of the acceleration exceeds the threshold, it is determined that the two-leg supporting state as shown in FIG. 1(b) is started, and the one-leg supporting state as shown in FIG. 1(a) is ended. That is, upon shifting from the one-leg supporting state to the two-leg supporting state when the human being 1 walks, a substantially upward relatively large acceleration (an acceleration which could not be generated in the normal one-leg supporting state) is generated on the hip 3 near the hip joints 8 as the free leg 2 is landed on the floor. Therefore, the leg motion determining means 25 judges that the two-leg supporting state is started and the one-leg supporting state is ended by comparing the detected data of the upward acceleration of the hip 3 from the hip vertical acceleration sensor 21 with the predetermined threshold.

In the processing of the leg motion determining means 25, furthermore, of the estimated values of the floor reaction forces Ff, Fr (see FIG. 1(b)) acting on the respective legs 2, 2 which are determined by the floor reaction force estimating means 38 as described later in the two-leg supporting state, the estimated value of the floor reaction force $Fr=^{T}$ (Frx, Frz) on the rear leg 2 with respect to the direction of travel of the human being 1 (specifically, the absolute value=$v(Frx^2+Frz^2)$ of the floor reaction force Fr determined in a preceding cycle time of the processing device 16) is compared with a predetermined threshold (a positive value that is of substantially "0"). When the absolute value of the estimated value of the floor reaction force Fr drops below the threshold, it is judged that the two-leg supporting state is ended and the one-leg supporting state is started. In the present embodiment, the initial motion state of the legs 2 is the two-leg supporting state, and until the estimated value of the floor reaction force on either one of the legs 2 drops below the above threshold, the leg motion determining means 25 judges that the motion state of the legs 2 is the two-leg supporting state.

Concurrent with the above processing of the leg motion determining means 25, the processing device 16 executes the processing of the chest tilted angle measuring means 26 and the hip tilted angle measuring means 27. In the processing of the chest tilted angle measuring means 26, a tilted angle θa of the chest 4 in the absolute coordinate system Cf is sequentially determined in each cycle time according to a known process using the so-called Karman filter, from the detected data of the anteroposterior acceleration of the chest 4 and the angular velocity of the chest 4 from the chest anteroposterior acceleration sensor 15 and the chest gyrosensor 14. Similarly, in the processing of the hip tilted angle measuring means 27, a tilted angle θb of the hip 3 in the absolute coordinate system Cf is sequentially determined using the Karman filter, from the detected data of the anteroposterior acceleration of the hip 3 and the angular velocity of the hip 3 from the hip anteroposterior acceleration sensor 20 and the hip gyrosensor 19. The respective tilted angles θa, θb of the chest 4 and the hip 3 in the absolute coordinate system Cf are tilted angles with respect to the vertical direction (the direction of the gravity), for example, in the present embodiment.

The tilted angles of the chest 4 and the hip 3 can be determined by integrating the detected data of the angular velocities from the gyrosensors 14, 19. However, the tilted angles θa, θb of the chest 4 and the hip 3 can accurately be measured using the Karman filter as with the present embodiment.

Then, the processing device 16 executes the processing of the leg posture calculating means 29 and the processing of the reference acceleration measuring means 28.

In the processing of the leg posture calculating means 29, tilted angles θc, θd of the thigh 9 and the lower thigh 11 of each leg 2 in the absolute coordinate system Cf (tilted angles with respect to the vertical direction, for example, see FIG. 2) are determined in each cycle time as follows: The tilted angle θc of the thigh 9 of each leg is calculated according to the following equation (6) from a current time value of the detected value of the bent angle Δθc of the hip joint 8 from the hip joint angle sensor 22 mounted on the leg 2 and a current time value of the tilted angle θb of the hip 3 determined by the hip motion determining means 25:

$$\theta c = \theta b + \Delta \theta c \quad (6)$$

The tilted angle θb of the hip 3 is of a negative value when the hip 3 is tilted with respect to the vertical direction such that the upper end of the hip 3 projects beyond the lower end of the hip 3 forward of the human being 1, and the bent angle Δθc of the hip joint 8 is of a positive value when the thigh 9 is tilted with respect to the axis of the hip 3 such that the lower end of the thigh 9 projects forward of the human being 1.

The tilted angle θd of the lower thigh 11 of each leg is calculated according to the following equation (7) from a current time value of the tilted angle θc of the thigh 9 and a current time value of the detected data of the bent angle Δθd of the knee joint 10 from the hip joint angle sensor 23:

$$\theta d = \theta c - \Delta \theta d \quad (7)$$

The bent angle of the knee joint 10 is of a positive value when the lower thigh 11 is tilted backward of the thigh 9 with respect to the axis of the thigh 9.

In the processing of the reference acceleration measuring means 28, an acceleration $a0 = {}^T(a0x, a0z)$ in the absolute coordinate system Cf of the origin O of the body coordinate system Cp is determined as follows: If a current time value of the detected data of the anteroposterior acceleration of the hip 3 from the hip anteroposterior acceleration sensor 20 is represented by ap and a current time value of the detected data of the vertical acceleration of the hip 3 from the hip vertical acceleration sensor 21 is represented by aq, then the acceleration $a0 = {}^T(a0x, a0z)$ in the absolute coordinate system Cf is determined according to the following equation (8) from the detected data ap, aq and the current time value of the tilted angle θb of the hip 3 which is determined by the hip tilted angle measuring means 27:

$$a0 = {}^T(a0x, a0z) = {}^T(ap \cdot \cos \theta b - aq \cdot \sin \theta b, ap \cdot \sin \theta b + aq \cdot \cos \theta b - g) \quad (8)$$

Then, the processing device 16 executes the processing of the part center-of-gravity position calculating means 30, determining the positions of the centers of gravity of various rigid body equivalent parts of the human body 1 in the body coordinate system Cp (the positions with respect to the origin of the body coordinate system Cp), using a rigid body link model to be described below.

Figure 5:
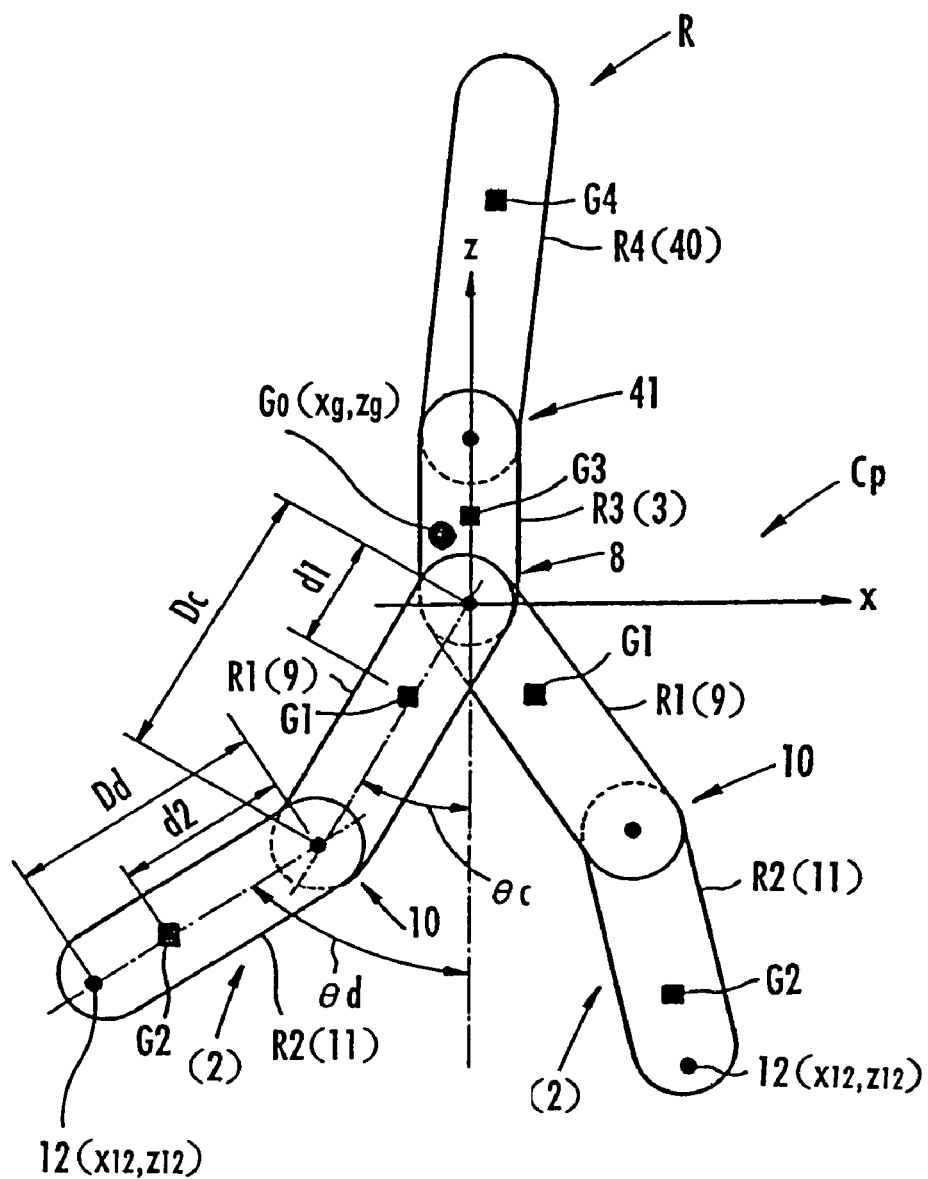
FIG. 5 is a view showing a rigid link model used in the processing operation of the processing device shown in FIG. 3.

As shown in FIG. 5, a rigid body link model R used in the present embodiment is a model which expresses the human being 1 as a joined assembly of rigid bodies R1, R1 corresponding to the thighs 9 of the respective legs 2, rigid bodies R2, R2 corresponding to the lower thighs 11, a rigid body R3 corresponding to the hip 3, and a rigid body R4 corresponding to a combination (hereinafter referred to as "upper body") 40 of the chest 4, the arms 7, 7, and the head 6. The junctions between the rigid bodies R1 and the rigid body 3 and the junctions between the rigid bodies R1 and the rigid bodies R2 correspond to the hip joints 8 and the knee joints 10. The junction between the rigid body R3 and the rigid body R4 corresponds to a tiltable support point 41 by which the chest 4 is tiltably supported on the hip 3.

In the present embodiment, the positions in the rigid body equivalent parts of the centers G1, G2, G3, G4 of gravity of the rigid body equivalent parts (the thighs 9 and the lower thighs 11 of the legs 2, the hip 3, and the upper body 40) of the human being 1 which correspond to the rigid bodies R1 through R4 of the rigid body link model R are determined in advance and stored in a memory (not shown) of the processing device 16.

The positions of the centers G1, G2, G3, G4 of gravity which are stored in the processing device 16 are positions in a coordinate system that is fixed with respect to the rigid body equivalent parts. The distances in the axial directions of the rigid body equivalent parts from the central points of the joints at ends of the rigid body equivalent parts are used as data representing the positions of the centers G1, G2, G3, G4 of gravity. Specifically, as shown in FIG. 4 for example, the position of the center G1 of gravity of each thigh 9 is represented as the position at the distance d1 in the axial direction of the thigh 9 from the center of the hip joint 8 of the thigh 9, and the position of the center G2 of gravity of each lower thigh 11 is represented as the position at the distance d2 in the axial direction of the lower thigh 11 from the center of the knee joint 10 of the lower thigh 11. The values of these distances d1, d2 are determined in advance and stored in the processing device 16. The positions of the centers G3, G4 of the other rigid body equivalent parts are similarly determined and stored.

Strictly, the position of the center G4 of gravity of the upper body 40 is affected by the motion of the arms 7, 7 included in the upper body 40. Since the arms 7, 7 are generally positioned symmetrically with respect to the axis of the chest 4 while the human being is walking, the position of the center G4 of gravity of the upper body 40 does not change substantially, and is essentially the same as the position of the center G4 of gravity of the upper body 40 when the human being is in the upstanding postural state.

In th present embodiment, furthermore, in addition to the data representing the positions of the centers G1, G2, G3, G4 of gravity of the rigid body equivalent parts (the thighs 9 and the lower thighs 11 of the legs 2, the hip 3, and the upper body 40), the data of the weights of the rigid body equivalent parts and the data of the sizes of the rigid body equivalent parts (e.g., the data of the lengths of the rigid body equivalent parts) are determined in advance and stored in the processing device 16.

The weight of the lower thigh 11 includes the weight of the foot 13. The data stored in the processing device 16 may be determined by an actual measurement, but may also be estimated based on average statistical data of human beings from the height and weight of the human being 1. Generally, the positions of the centers G1, G2, G3, G4 of gravity of the rigid body equivalent parts, the weights and sizes thereof are correlated to the height and weight of the human being, and it is possible to estimate, with relatively good accuracy, the positions of the centers G1, G2, G3, G4 of gravity of the rigid body equivalent parts, the weights and sizes thereof from the data of the height and weight of the human being based on the correlated data.

The part center-of-gravity position calculating means 30 determines the positions of the centers G1, G2, G3, G4 of gravity of the rigid body equivalent parts in the body coordinate system Cp (the xz coordinate system shown in FIG. 5) having the origin O fixed to the hip 3, from the data stored in the processing device 16 as described above, the current time values of the tilted angle θa of the chest 4 (=the tilted angle of the upper body 39) and the tilted angle θb of the hip 3 which are determined respectively by the chest tilted angle measuring means 26 and the hip tilted angle measuring means 27, and the current time values of the tilted angles θc, θd of the thigh 9 and the lower thigh 11 of each leg 2 which are determined by the leg posture calculating means 29.

Because the tilted angles θa through θd of the rigid body equivalent parts (the thighs 9 and the lower thighs 11 of the legs 2, the hip 3, and the upper body 40) are determined as described above, the positions and postures of the rigid body equivalent parts in the body coordinate system Cp are known from the data of the tilted angles θa through θd and the data of the sizes of the rigid body equivalent parts. Therefore, the positions of the centers G1, G2, G3, G4 of gravity of the rigid body equivalent parts in the body coordinate system Cp are determined.

Specifically, as shown in FIG. 5, since the tilted angle (the tilted angle with respect to the z-axis direction) in the body coordinate system Cp of the thigh 9 of the leg 2 that is positioned on the left side in FIG. 5 is θc (θc<0 in FIG. 5), the coordinates of the position of the center G1 of gravity of the thigh 9 in the body coordinate system Cp are given as (d1·sin θc, −d1·cos θc). Furthermore, since the tilted angle of the lower thigh 11 in the body coordinate system Cp is θd (θd<0 in FIG. 5), the coordinates of the position of the center G2 of gravity of the lower thigh 11 in the body coordinate system Cp are given as (Dc·sin θc+d2·sin θd, −Dc·cos θc−d2·cos θd) where Dc represents the length of the thigh 9. The centers of the gravity of the thigh 9 and the lower thigh 11 of the other leg, the hip 3, and the upper body 40 are determines in the same manner as described above.

After the part center-of-gravity position calculating means 30 has thus determined the positions of the centers G1, G2, G3, G4 of gravity of the rigid body equivalent parts in the body coordinate system Cp, the processing device 16 executes the processing of the body center-of-gravity position calculating means 31 to determine the position (xg, zg) of the body center G0 of gravity of the human being 1 in the body coordinate system Cp, using the data of the positions of the centers G1, G2, G3, G4 of gravity of the rigid body equivalent parts and the data of the weights of the rigid body equivalent parts.

It is assumed that the position of the center G3 of gravity of the hip 3 in the body coordinate system Cp and the weight thereof are represented by (x3, z3), m3, the position of the center G4 of gravity of the upper body 40 and the weight thereof by (x4, z4), m4, the position of the center G1 of gravity of the thigh 9 of the leg 2 on the left side of the human being 1 as it faces forward and the weight thereof by (x1L, z1L), m1L, the position of the center G2 of gravity of the lower thigh 11 of the same leg 2 and the weight thereof by (x2L, z2L), m2L, the position of the center G1 of gravity of the thigh 9 of the leg 2 on the right side and the weight thereof by (x1R, z1R), m1R, the position of the center G2 of gravity of the lower thigh 11 of the same leg 2 and the weight thereof by (x2R, z2R), m2R, and the body weight of the human body 1 by M(=m1L+m2L+m1R+m2R+m3+m4). Now, the position (xg, zg) of the body center G0 of gravity of the human being 1 in the body coordinate system Cp is determined according to the following equations (9):

$$xg=(m1L \cdot x1L+m1R \cdot x1R+m2L \cdot x2L+m2R \cdot x2R+m3 \cdot x3+m4 \cdot x4)/M$$

$$zg=(m1L \cdot z1L+m1R \cdot z1R+m2L \cdot z2L+m2R \cdot z2R+m3 \cdot z3+m4 \cdot z4)/M \qquad (9)$$

After having thus executed the processing of the body center-of-gravity position calculating means 31, the processing device 16 executes the processing of the body center-of-gravity acceleration calculating means 34, the processing of the ankle position calculating means 32, and the processing of the MP height calculating means 33.

In the processing of the body center-of-gravity acceleration calculating means 34, the second differential of the position (xg, zg) of the body center G0 of gravity in the body coordinate system Cp, i.e., an acceleration $^T(d^2xg/dt^2, d^2zg/dt^2)$ of the body center G0 of gravity with respect to the origin O of the body coordinate system Cp, is determined using time-series data of the position (xg, zg) of the body center G0 of gravity in the body coordinate system Cp which is determined by the part center-of-gravity position calculating means 31 in each cycle time. An acceleration a=$^T$(ax, az) of the body center G0 of gravity in the absolute coordinate system Cf is then determined by determining a vector sum of the acceleration $^T(d^2xg/dt^2, d^2zg/dt^2)$ and the acceleration $a_0=^T$(a0x, a0z) in the absolute coordinate system Cf of the origin O of the body coordinate system Cp which is determined by the hip tilted angle measuring means 27.

In the processing of the ankle position calculating means 32, the position of the ankle 12 of each leg 2 in the body coordinate system Cp is determined according to the same processing as that of the part center-of-gravity position calculating means 30, from the current time values of the data of the tilted angles θc, θd of the thigh 9 and the lower thigh 11 of each leg 2 which are determined by the leg posture calculating means 29, the current time value of the tilted angle θb of the hip 3 which is determined by the hip tilted angle measuring means 27, and the data of the sizes (lengths) of the thigh 9 and the lower thigh 11. Specifically, as shown in FIG. 5, if the length (the length from the center of the knee joint 10 to the ankle 12) of the lower thigh 11 of the leg 2 that is positioned on the left side in FIG. 5 is represented by Dd, then the coordinates (x12, z12) of the position of the ankle 12 in the body coordinate system Cp are expressed by (Dc·sin θc+Dd·sin θd, −Dc·cos θc−Dd·cos θd) (θc<0, θd<0 in FIG. 4). This also holds true for the other leg 2.

A position vector $^T$(x12−xg, z12−zg) of the ankle 12 of each leg 2 with respect to the body center G0 of gravity, i.e., ΔXf, ΔZf, ΔXr, ΔZr in the equation (5), is determined from the position (x12, z12) of the ankle 12 in the body coordinate system Cp and the current time value of the data of the position (xg, zg) of the body center G0 of gravity in the body coordinate system Cp which is determined by the body center-of-gravity position calculating means 31.

In the processing of the MP height calculating means 33, a tilted angle θ of the foot 13 of each leg 2 with respect to the floor surface is calculated using the detected data from the acceleration sensor 24, as described above with reference to FIG. 3, and an MP height H is determined from the tilted angle θ. A gyrosensor, rather than the acceleration sensor 24, may be installed on footwear or the like, and tilted angle θ of the foot 13 may be calculated from detected data from the gyrosensor and an MP height H may be determined from the tilted angle θ thus calculated. Furthermore, an optical distance sensor may be installed on footwear or the like for directly measuring an MP height H.

Then, the processing device 16 executes the processing of the floor reaction force estimating means 38 as follows: In this processing, an estimated value of a total floor reaction force $F={}^T(Fx, Fz)$ is sequentially determined in each cycle time according to the above equation (2), from the values of the body weight M of the human being 1 and the gravitational acceleration g (which are stored in advance in the processing device 16) and the current time value of the acceleration $a={}^T(ax, az)$ of the body center G0 of gravity in the absolute coordinate system Cf which is determined by the body center-of-gravity acceleration calculating means 34. If the motion state of the legs 2 judged in the present cycle time by the leg motion determining means 25 is the one-leg supporting state, then the estimated value of the total floor reaction force $F={}^T(Fx, Fz)$ is directly determined as an estimated value of a total floor reaction force acting on the single leg 2 that is landed on the floor. A floor reaction force acting on the leg 2 not landed on the floor (the free leg 2) is ${}^T(0, 0)$.

If motion state of the legs 2 judged in the present cycle time by the leg motion determining means 25 is the two-leg supporting state, then an estimated value of a vertical component Frz of the floor reaction force Fr acting on the rear leg 2, which is present rearward in the direction of travel of the human being 1, is determined using the data of the MP height H of the front leg 2 which is determined by the MP height calculating means 33, based on the correlation between the vertical component Frz of the floor reaction force Fr acting on the rear leg 2 and the MP height H of the front leg 2, which is present forward in the direction of travel of the human being 1.

The above correlation will be described below. The inventor of the present application has found, as a result of intensive efforts, that if the MP height of the front leg 2 is represented by H(t) and the vertical component of the floor reaction force acting on the rear leg 2 by Frt(t) at each time point after the heel of the foot of the front leg is landed until the toe thereof is landed during normal walking, and the MP height of the front leg 2 is represented by H0 and the vertical component of the floor reaction force acting on the rear leg 2 by Frt(0) at the time the heel of the front left 2 is landed, then a correlation shown in FIG. 6 is established between the ratio of H(t) to H0 (the MP height ratio=H(t)/H0) and the ratio of Frz(t) to Frz0 (the reaction force ratio=Frz(t)/Frz0).

Figure 6:
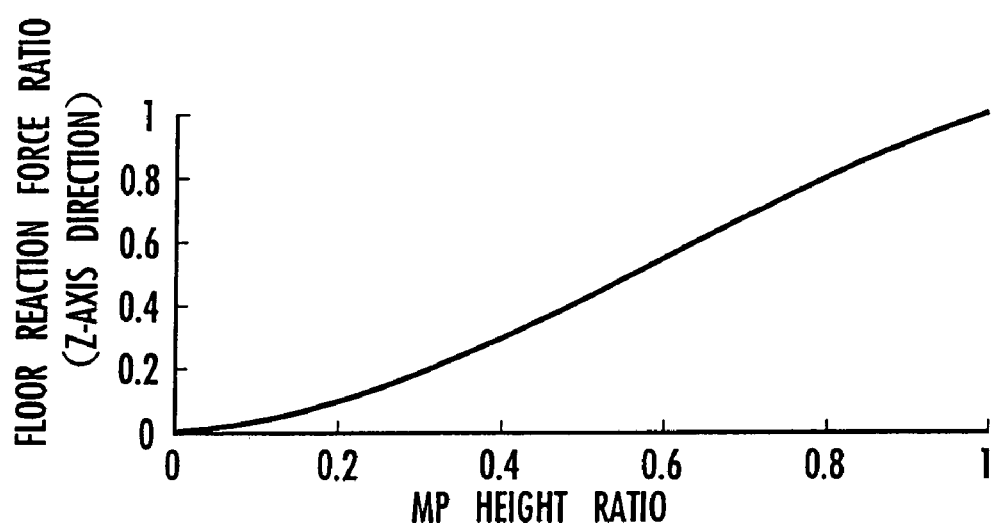
FIG. 6 is a diagram showing the correlation between the MP height of a front leg and the vertical component of a floor reaction force acting on a rear leg.

In the present embodiment, the correlation shown in FIG. 6 is stored in advance as a data table or a polynomial function approximating the correlation in the processing device 16. The MP height of the front leg 2 and the vertical component of the total floor reaction force at the time the leg motion determining means 25 judges that the two-leg supporting state is started are set to H0 and Frz0, respectively, and an estimated value of the vertical component Frz of the floor reaction force acting on the rear leg 2 is sequentially determined based on the correlation shown in FIG. 6 from the data of the MP height of the front leg 2 which is determined by the MP height calculating means 33. That is, an estimated value of Frz at each time point is determined by multiplying the reaction force ratio corresponding to the MP height ratio at each time point by Frz0. Then, the estimated value of Frz is subtracted from the estimated value of the vertical component Fz of the total floor reaction force determined in each cycle time, thus sequentially determining an estimated value of the vertical component Ffz (=Fz−Frz) of the floor reaction force acting on the front leg 2. Thus, the vertical components Frz, Ffz of the floor reaction forces on the legs 2, 2 in the two-leg supporting state are sequentially determined.

Furthermore, ΔXf, ΔZf, ΔXr, ΔZr determined by the ankle position calculating means are put in the equation (5) to determine an estimated value of a component Ffx (horizontal component) in the direction of travel of the floor reaction force acting on the front leg 2, and an estimated value of a component Frx (horizontal component) in the direction of travel of the floor reaction force acting on the rear leg 2.

Concurrent with the above processing, the processing device 16 executes the processing of the rigid body part acceleration calculating means 35, the processing of the rigid body part angular acceleration calculating means 36, and the processing of the floor reaction force acting point estimating means 37.

In the processing of the rigid body part acceleration calculating means 35, as with the processing of the body center-of-gravity acceleration calculating means 34, the second differentials of the positions of the centers G1, G2 of gravity of the thigh 9 and the lower thigh 11 in the body coordinate system Cp, i.e., accelerations of the centers G1, G2 of gravity of the thigh 9 and the lower thigh 11 in the body coordinate system Cp (accelerations with respect to the origin O of the body coordinate system Cp), are determined using time-series data of the positions of the centers G1, G2 of gravity of the thigh 9 and the lower thigh 11 which are rigid body equivalent parts of each leg in the body coordinate system Cp which are determined by the part center-of-gravity position calculating means 30 in each cycle time. Accelerations of the thigh 9 and the lower thigh 11 in the absolute coordinate system Cf (more specifically, coordinate components in the absolute coordinate system Cf of the accelerations) are then determined by determining a vector sum of these accelerations and the acceleration $a_0={}^T(a0x, a0z)$ in the absolute coordinate system Cf of the hip 3 which is determined by the reference acceleration measuring means 28.

In the processing of the rigid body part angular acceleration calculating means 36, the second differentials of the tilted angles θc, θd of the thigh 9 and the lower thigh 11 of each leg 2, i.e., respective angular accelerations of the thigh 9 and the lower thigh 11, are determined using the time-series data of the tilted angles θc, θd of the thigh 9 and the lower thigh 11 of each leg 2 which are determined by the leg posture calculating means 29 in each cycle time.

In the processing of the floor reaction force acting point estimating means 37, a vector (a position vector of a floor reaction force acting point on the ankle 12, hereinafter referred to as "floor reaction force acting point vector") from the ankle 12 of the landed leg 2 to a floor reaction force acting point on the foot 13 of the leg 2 (a point where the total floor reaction force acting on the landed region of the foot 13 is regarded as concentrating) is determined as data representing the position of the floor reaction force acting point based on correlation data shown in FIGS. 7 and 8, from the current time value of the tilted angle θc of the thigh 9 which is calculated by the leg posture calculating means 29, for example.

Specifically, according to the finding of the inventor of the present application, tilted angles θc, θd of the thigh 9 and the lower thigh 11 of the leg 2 which is landed are correlated relatively strongly to the floor reaction force acting point. For example, the floor reaction force acting point vector, i.e., the component of the floor reaction force acting point vector in the direction of travel (the X-axis direction) of the human being 1 and the component of the floor reaction force acting point vector in the vertical direction (the Z-axis direction), changes as shown in FIGS. 7 and 8 with respect to the tilted angle θc of the thigh 9. The negative tilted angle θc of the thigh 9 is a tilted angle when the leg 2 extends rearward of the human being 1 (e.g., the right leg 2 of the human being 1 as it faces forward in FIG. 2), and the positive tilted angle θc of the thigh 9 is a tilted angle when the leg 2 is present forward of the human being 1 (e.g., the left leg 2 of the human being 1 as it faces forward in FIG. 2).

Figure 7:
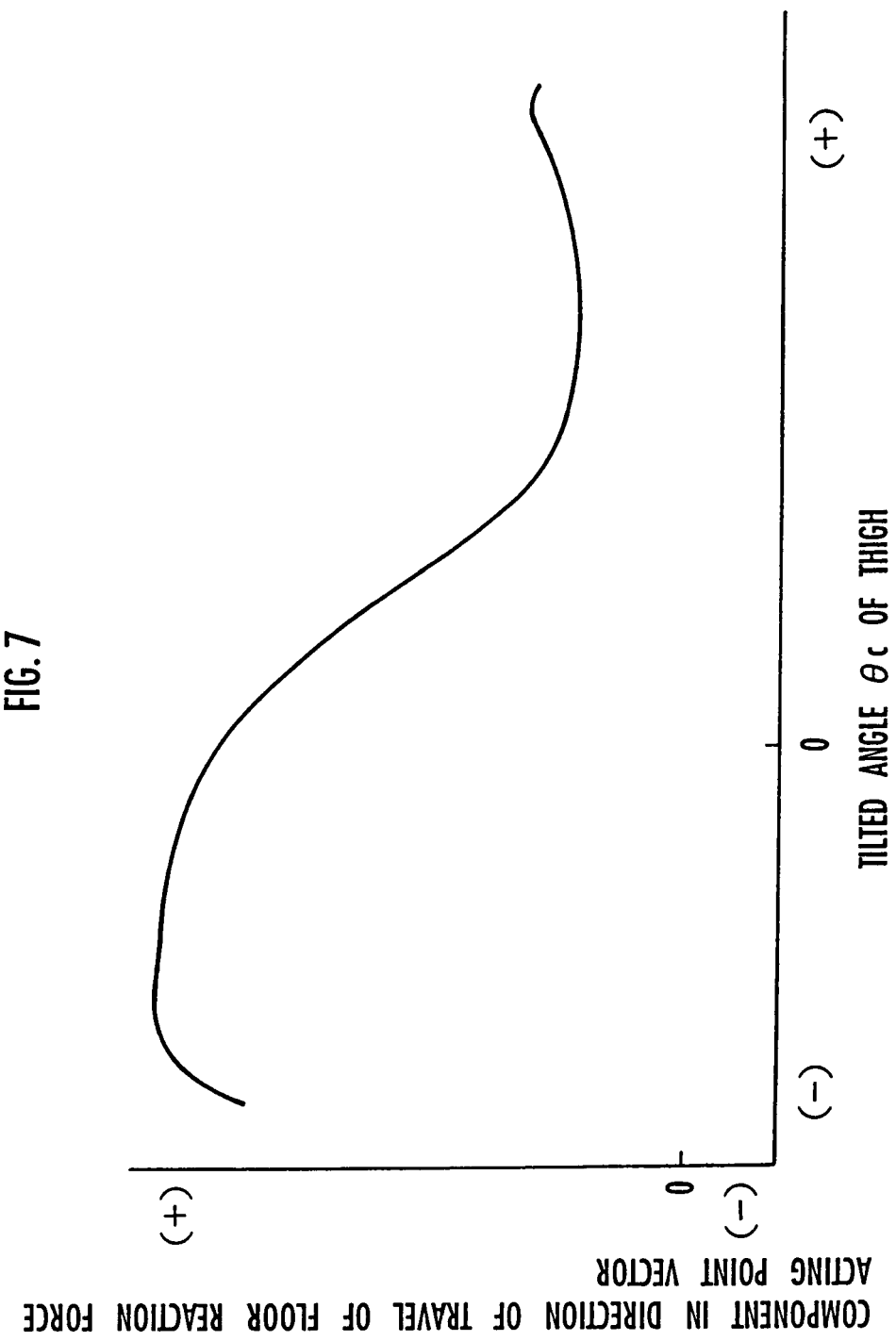
FIG. 7 is a diagram showing the correlation between the tilted angle of a thigh and the component in the direction of travel of a floor reaction force acting point vector.
Figure 8:
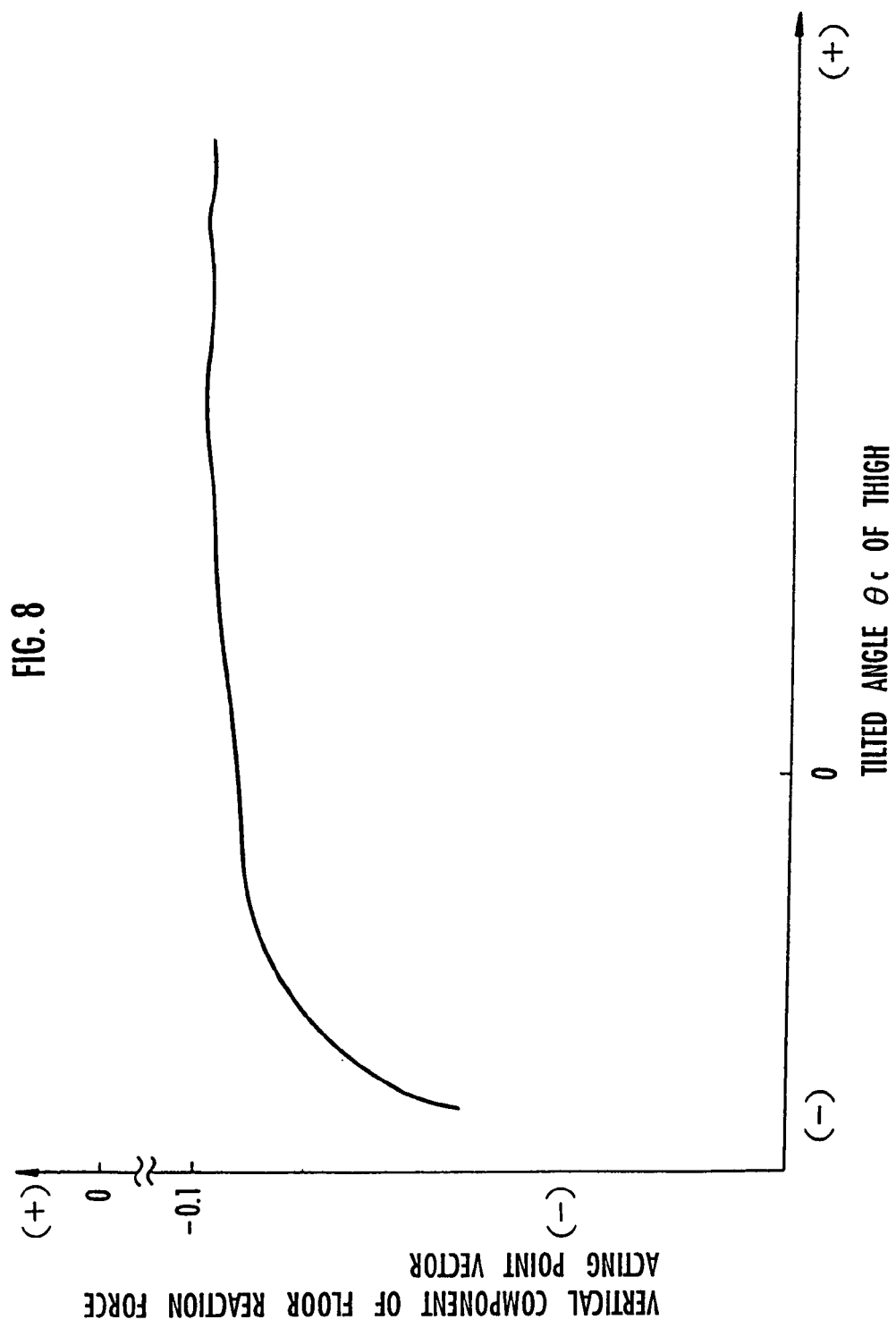
FIG. 8 is a diagram showing the correlation between the tilted angle of a thigh and the component in the vertical direction of a floor reaction force acting point vector.

In the present embodiment, the correlation data shown in FIGS. 7 and 8 are stored in advance as a data table or a polynomial function approximating the correlation data in the processing device 16. In the processing of the floor reaction force acting point estimating means 37, the floor reaction force acting point vector (specifically, the components of the floor reaction force acting point vector in the X-axis direction and the Z-axis direction) is determined based on the correlation data from the current time value of the tilted angle θc of the thigh 9 which is calculated by the leg posture calculating means 29.

The position of the floor reaction force acting point is also correlated to the relative angle (the bent angle of the knee joint 10) between the thigh 9 and the lower thigh 11 of the landed leg 2. Therefore, the position of the floor reaction force acting point may be estimated from the above relative angle, instead of the tilted angle θc of the thigh 9, or may be estimated from a map or the like using both the tilted angle θc of the thigh 9 and the relative angle.

Then, the processing device 16 executes the processing of the joint moment estimating means 39 to determine moments acting on the knee joint 10 and the hip joint 8 of each leg 2. This processing is performed based on a so-called inverse dynamic model using the current time values of the data determined by the floor reaction force estimating means 38, the rigid body part acceleration calculating means 35, the rigid body part angular acceleration calculating means 36, the floor reaction force acting point estimating means 37, and the leg posture calculating means 29. The inverse dynamic model serves to determine moments acting on the joints successively from the joints closer to the floor reaction force acting point, using a motion equation relative to the translation of each rigid body equivalent part of the human being 1 and a motion equation relative to the rotation thereof. In the present embodiments, moments acting on the knee joint 10 and the hip joint 8 of each leg 2 are successively determined.

Figure 9:
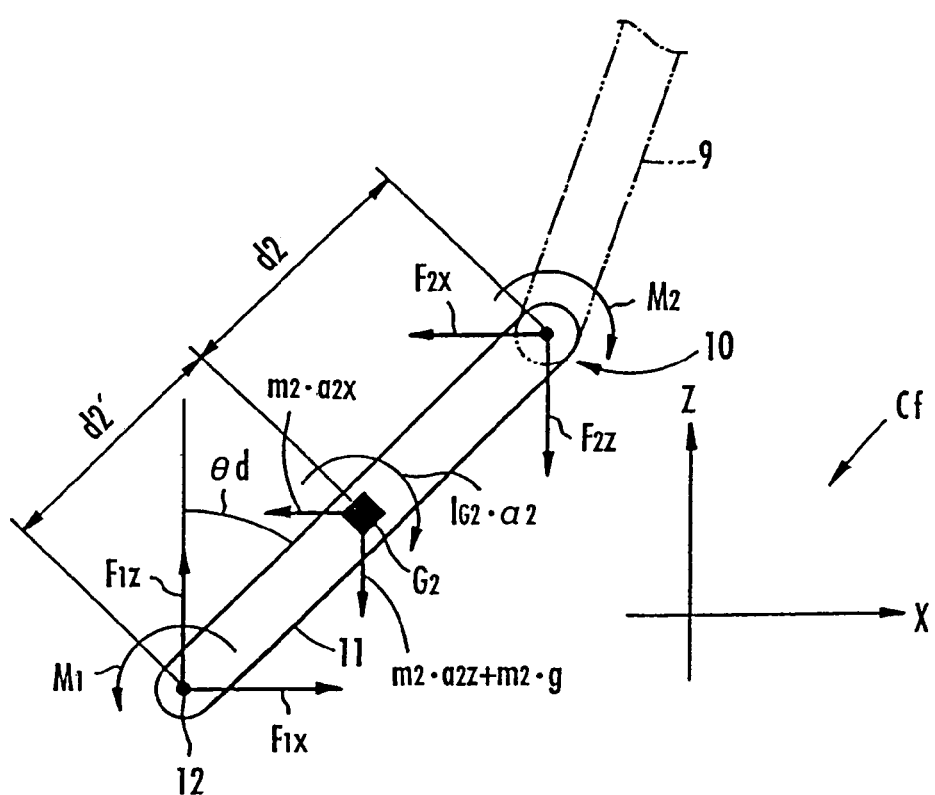
FIG. 9 is a view illustrative of the principles of measuring a joint moment.

More specifically, as shown in FIG. 9, with respect to the lower thigh 11 of each leg, a force (joint reaction force) acting on the ankle 12 on the distal end of the lower thigh 11, a force (joint reaction force) acting on the knee joint 10 of the lower thigh 11, and a translational acceleration of the center G2 of gravity of the lower thigh 11 are represented by $^T(F1x, F1z)$, $^T(F2x, F2z)$, $^T(a2x, a2z)$, respectively, according to the component expression of the absolution coordinate system Cf, and the weight of the lower thigh 11 is represented by m2. At this time, a motion equation relative to the translation of the center G2 of gravity of the lower thigh 11 is given as the following equation (10):

$$^T(m2 \cdot a2x, m2 \cdot a2z) = ^T(F1x-F2x, F1z-F2z-m2 \cdot g)$$

and hence, $$^T(F2x, F2z) = ^T(F1x-m2 \cdot a2x, F1z-m2 \cdot a2z-m2g) \quad (10)$$

The acceleration $^T(a2x, a2z)$ of the center G2 of gravity of the lower thigh 11 is determined by the rigid body part acceleration calculating means 35. The junction reaction force $^T(F1x, F1z)$ acting on the ankle 12 on the distal end of the lower thigh 11 is approximately equal to an estimated value of the floor reaction force which is determined by the floor reaction force estimating means 38 with respect to the leg 2 which as the above lower thigh 11. More specifically, when the leg 2 is landed in the one-leg supporting state, the junction reaction force $^T(F1x, F1z)$ is the total floor reaction force $^T(Fx, Fz)$ determined according to the equation (2), and when the leg 2 is the free leg, then $^T(F1x, F1z) = ^T(0, 0)$. When the leg 2 is the rear leg in the direction of travel of the human being 1 in the two-leg supporting state, the junction reaction force $^T(F1x, F1z)$ is the floor reaction force $^T(Frx, Frz)$ on the rear leg. When the leg 2 is the front leg, the junction reaction force $^T(F1x, F1z)$ is the floor reaction force $^T(Ffx, Ffz)$ on the front leg.

Therefore, the junction reaction force $^T(F2x, F2z)$ acting on the knee joint 10 of each leg 2 is determined according to the above equation (10) from the data of the acceleration $^T(a2x, a2z)$ of the center G2 of gravity of the lower thigh 11 which is determined by the rigid body part acceleration calculating means 35, the data of the floor reaction force $(=^T(F1x, F1z))$ which is determined by the floor reaction force estimating means 38, the predetermined data of the weight m2 of the lower thigh 11, and the value of the gravitational acceleration g.

Referring to FIG. 9, a moment acting on the ankle 12 on the distal end of the lower thigh 11 is represented by M1, a moment acting on the knee joint 10 of the lower thigh 11 by M2, an inertial moment about the center G2 of gravity of the lower thigh 11 by IG2, and an angular acceleration about the center G2 of gravity of the lower thigh 11 by α2. In association with FIG. 4, the distance between the center G2 of gravity of the lower thigh 11 and the center of the knee joint 10 is represented by d2, and the distance between the center G2 of gravity of the lower thigh 11 and the ankle 12 by d2' (=Dd−d2). A motion equation relative to the rotation about the center G2 of gravity of the lower thigh 11 is given as the following equation (11):

$$IG2 \cdot \alpha2 = M1 - M2 + F1x \cdot d2' \cdot \cos\theta d - F1z \cdot d2' \cdot \sin\theta d + F2x \cdot d2 \cdot \cos\theta d - F2z \cdot d2 \cdot \sin\theta d$$

and hence $$M2 = M1 - IG2 \cdot \alpha2 + F1x \cdot d2' \cdot \cos\theta d - F1z \cdot d2' \cdot \sin\theta d + F2x \cdot d2 \cdot \cos\theta d - F2z \cdot d2 \cdot \sin\theta d \quad (11)$$

M1 in the equation (11) is a moment obtained as the outer product of a floor reaction force acting point vector determined by the floor reaction force acting point estimating means 37 with respect to the leg 2 which has the lower thigh 11 relative to the equation (11) and a floor reaction force vector determined by the floor reaction force estimating means 38 with respect to the leg 2. α2 represents an angular acceleration of the lower thigh 11 which is determined by the leg center-of-gravity acceleration calculating means 34. θd represents a tilted angle of the lower thigh 11 which is determined by the leg posture calculating means 29. $^T(F1x, F1z)$ represents an estimated value of the floor reaction force which is determined by the floor reaction force estimating means 38 as described above. $^T(F2x, F2z)$ is determined according to the above equation (10). The inertial moment IG2 is determined and stored, together with the data of the weight m2 and the size of the lower thigh 11, in advance in the processing device 16.

Therefore, the moment M2 acting on the knee joint 10 is determined according to the equation (11) from the data of the estimated value of the floor reaction force from the floor reaction force estimating means 38, the data of the floor reaction force acting point vector from the floor reaction force acting point estimating means 37, the data of the angular acceleration α2 of the lower thigh 11 from the rigid body part angular acceleration calculating means 36, the data of the tilted angle θd of the lower thigh 11 from the leg posture calculating means 29, the data of the joint reaction force $^T(F2x, F2z)$ determined according to the above equation (10), and the predetermined data of the initial moment IG2, the size (Dd), and the position (d2) of the center G2 of gravity of the lower thigh 11.

After having thus determined the moment M2 acting on the knee joint 10 of the lower thigh 11, the joint moment estimating means 39 determines a moment acting on the hip joint 8 of the thigh 9 according to the same process as the process for calculating the moment M2. Since the basic concept of the process is the same as the process of determining the moment M2 of the knee joint 10, it will not be illustrated and described in detail, but is summarized as follows:

First, a joint reaction force $^T(F3x, F3z)$ acting on the hip joint 8 of the thigh 9 is determined according to the following equation (12) (which is of the same pattern as the above equation (10)) based on the motion equation relative to the translation of the center G1 of gravity of the thigh 9 (see FIG. 5):

$$^T(F3x, F3z)=^T(F2x-m1 \cdot a1x, F2z-m1 \cdot a1z-m1 \cdot g) \quad (12)$$

Where $^T(F2x, F2z)$ represents a joint reaction force on the knee joint 10 which is determined according to the equation (10), $^T(a1x, a1z)$ an acceleration (translational acceleration) in the absolute coordinate system Cf of the center G1 of gravity of the thigh 9 which is determined by the rigid body part acceleration calculating means 35, m1 the predetermined weight of the thigh 9, and g the gravitational acceleration.

Then, a moment M3 acting on the hip joint 8 of the thigh 9 is determined according to the following equation (13) (which is of the same pattern as the above equation (11)) based on the motion equation relative to the rotation about the center G1 of gravity of the thigh 9:

$$M3=M2-IG1 \cdot \alpha1+F2x \cdot d1' \cdot \cos \theta c-F2z \cdot d1' \cdot \sin \theta c+F3x \cdot d1 \cdot \cos \theta c-F3z \cdot d1 \cdot \sin \theta c \quad (13)$$

Where M2 represents the moment of the knee joint 10 determined according to the equation (11), $^T(F2x, F2z)$ the joint reaction force on the knee joint 10 which is determined according to the equation (10), $^T(F3x, F3z)$ the joint reaction force on the hip joint 8 which is determined according to the equation (12), IG1 a predetermined inertial moment about the center G1 of gravity of the thigh 9, α1 the angular acceleration of the thigh 9 which is determined by the rigid body part angular acceleration calculating means 36, θc the tilted angle of the thigh 9 which is determined by the leg posture calculating means 29, d1 the distance from the center of the hip joint 8 to the center G1 of gravity of the thigh 9 (see FIG. 5), and d1' the distance from the center of the knee joint 10 to the center G1 of gravity of the thigh 9 (Dc−d1 in FIG. 5). These distances are determined from the predetermined position of the center G1 of gravity and the predetermined size (length) of the thigh 9.

The above processing is sequentially executed in each cycle time of the processing device 16 to estimate, sequentially in real-time, floor reaction forces acting on the legs 2 and moments acting on the knee joints 10 and the hip joints 8 of the legs 2.

While not described in detail in the present specification, the determined estimated values of the moments on the knee joints 10 and the hip joints 8 are used to control devices for assisting the human being 1 to walk (devices including electric motors, etc. for applying assistive torques to the knee joints 10 and the hip joints 8), for example.

Figure 10:
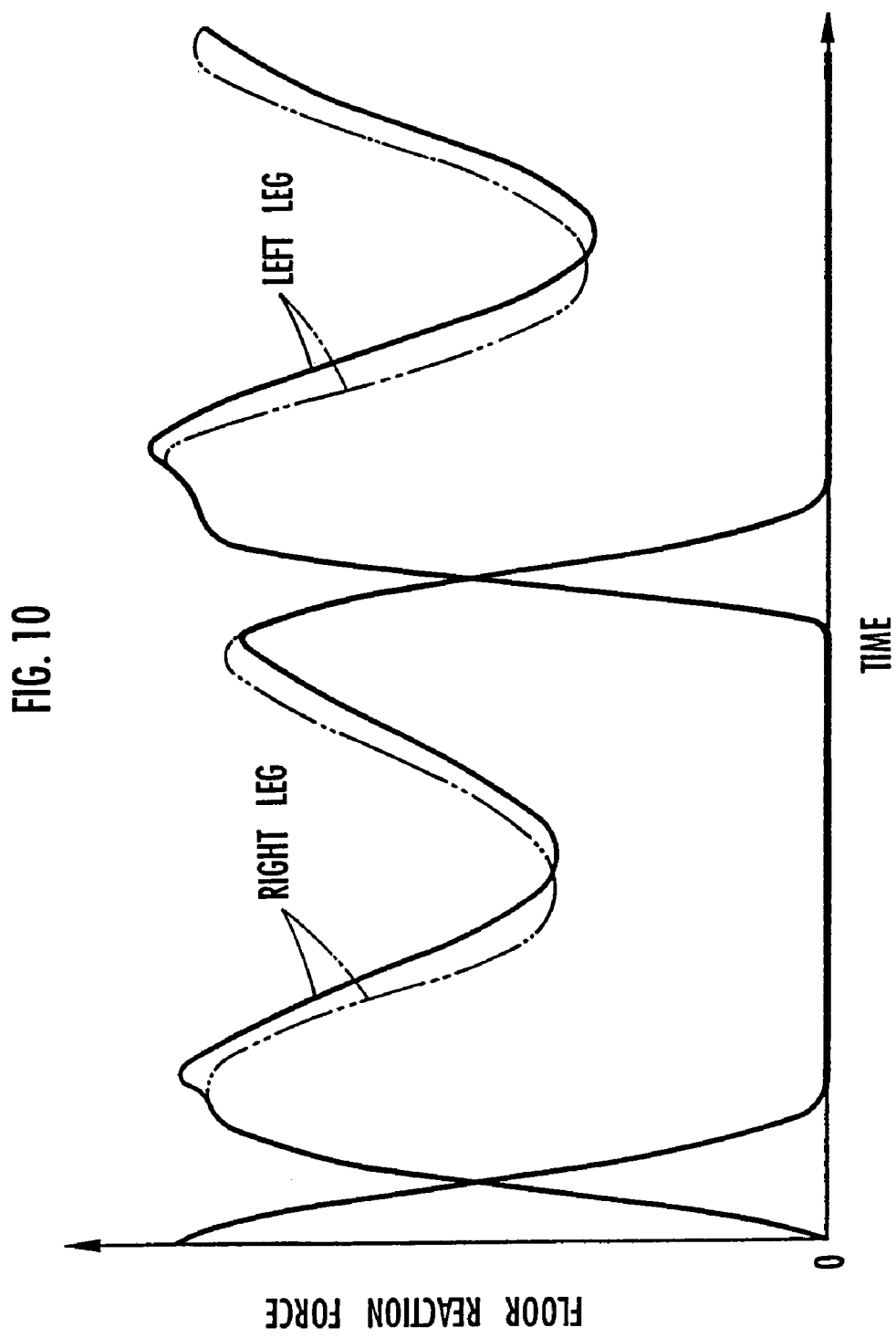
FIG. 10 is a graph showing the manner in which estimated values of floor reaction forces determined according to the embodiment of the present invention change with time.
Figure 11:
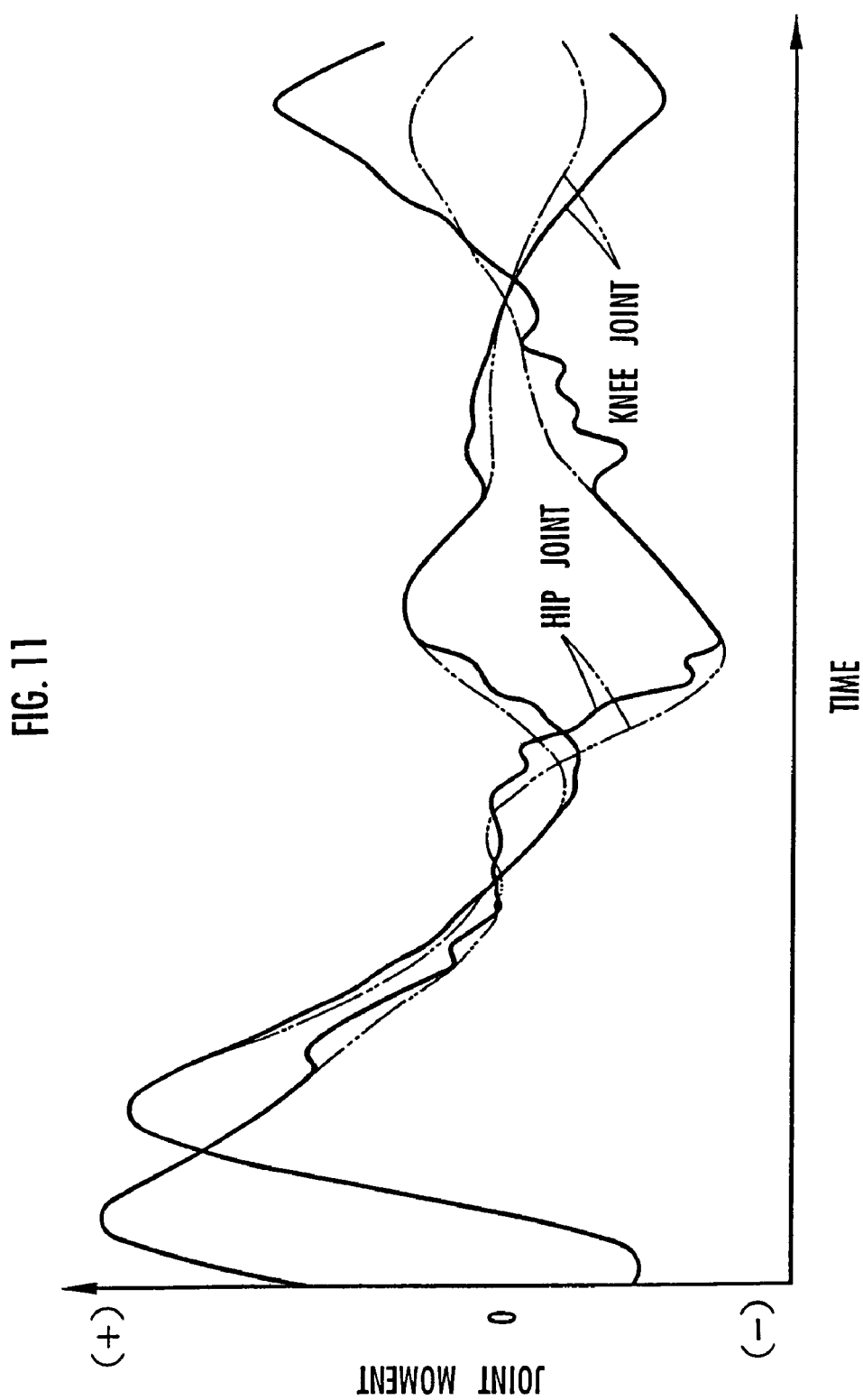
FIG. 11 is a graph showing the manner in which estimated values of the moments of a knee joint and a hip joint which are determined according to the embodiment of the present invention changes with time.

The manner in which the estimated values of floor reaction forces determined by the above processing of the processing device 16 (specifically, the absolute values of the estimated values of floor reaction forces) change with time is illustrated by way of solid-line curves in FIG. 10. The manner in which the estimated values of the moments on the knee joints 10 and the hip joints 8 which are determined by the processing of the processing device 16 is illustrated by way of solid-line curves in FIG. 11. FIGS. 10 and 11 show data obtained when the human being 1 walks at a substantially constant speed on flat terrain. In FIG. 10, comparative examples where the floor reaction forces are measured by a force meter or the like (corresponding to real values of the floor reaction forces) are also illustrated by way of imaginary-line curves. In FIG. 11, comparative examples where the moments on the knee joints 10 and the hip joints 8 are measured by a torque meter or the like (corresponding to real values of the moments on the knee joints 10 and the hip joints 8) are also illustrated by way of imaginary-line curves.

It can be seen from a review of FIG. 10 that accurate estimated values of the floor reaction forces are obtained according to the present embodiment. In the present embodiment, the moments on the knee joints 10 and the hip joints 8 can be estimated with relatively good accuracy, as shown in FIG. 11, by using the estimated values of the floor reaction forces.

According to the present embodiment, as described above, floor reaction forces acting on the legs 2 and moments acting on the knee joints 10 and the hip joints 8 of the legs 2 can be estimated easily in real-time, using relatively small and lightweight sensors such as the angle sensors 22, 23 mounted on the knee joints 10 and the hip joints 8, the gyrosensors 14, 19 and the acceleration sensors 15, 20, 21 mounted on the torso 5, and the acceleration sensor 24 installed on footwear, without the need for the installation on the legs 2 of sensors which would tend to obstruct the walking of the human being 1 and place a burden on the motion of the legs 2.

In the above embodiment, the present invention is illustrated as being applied to the human being 1. However, the present invention is also applicable to a bipedal walking robot as a bipedal movable body. Some bipedal walking robots have a hip and a chest that are integrally combined with each other. In such a case, a gyrosensor and an anteroposterior acceleration sensor may be mounted on either one of the hip and the chest, and floor reaction forces and moments on the joints of the legs may be estimated in the same manner as with the present embodiment. With bipedal walking robots, bent angles of the hip joints and the knee joints can be grasped from the control variables of a control device for controlling actuators of those joints.

In the above embodiment, the detected data from the hip vertical acceleration sensor 21 is directly used to judge the motion state of the legs 2. However, the value of the component in the vertical direction (Z-axis direction) of the acceleration a0 of the hip 3 in the absolute coordinate system Cf which is determined by the reference acceleration measuring means 28, for example, may be used instead of the above detected data.

In the above embodiment, the estimated values of the components Ffx, Frx in the direction of travel (the components in the horizontal direction) of the floor reaction forces acting on the front and rear legs in the two-leg supporting state are determined by the same process as with the prior application. However, an estimated value of the component Frx in the direction of travel of the floor reaction force acting on the rear leg may sequentially be determined based on the correlation between the component in the direction of travel of the floor reaction force acting on the rear leg and the traveling speed of the bipedal movable body, and the component Frx may be subtracted from the estimated value of the component Fx in the direction of travel of the total floor reaction force to sequentially determine an estimated value of the component Ffx in the direction of travel of the floor reaction force acting on the front leg.

Figure 12:
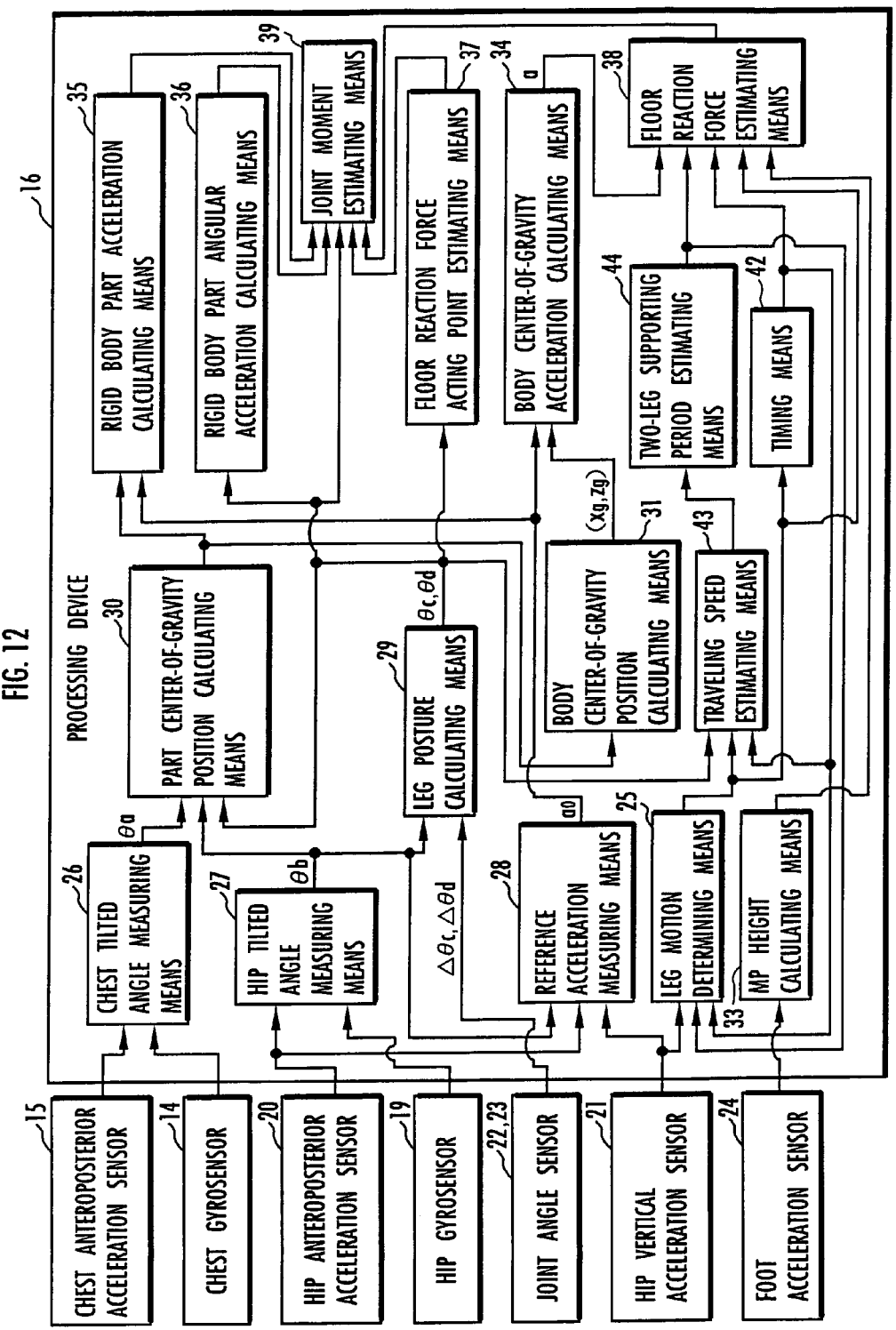
FIG. 12 is a block diagram illustrative of the functions of a processing device according to a first embodiment of the present invention.

A second embodiment for determining estimated values of the components Ffx, Frx in the direction of travel of the floor reaction force acting on the legs 2 according to the above process will be described below. According to the second embodiment, as shown in FIG. 12, the processing device 16 has, in place of the ankle position calculating means 32 according to the first embodiment, a timing means 42 for measuring an elapsed time from the start of the two-leg supporting state each time the start of the two-leg supporting state (the end of the one-leg supporting state) is grasped by the leg motion determining means 25, a traveling speed estimating means 43 for estimating a traveling speed of the human being 1 using the data of the respective tilted angle $\theta c$, $\theta d$ of the thigh 9 and the lower thigh 11 of each leg 2 from the leg posture calculating means 29 and the timing data from the timing means 42 each time the start of the two-leg supporting state (the end of the one-leg supporting state) is grasped by the leg motion determining means 25, and a two-leg supporting period estimating means 44 for estimating a time from the start to the end of the two-leg supporting state (the duration of the two-leg supporting state, hereinafter referred to as "two-leg supporting period") from the data of the traveling speed from the traveling speed estimating means 43.

In the processing of the leg motion determining means 25, when the start of the two-leg supporting state is grasped based on the detected data of the upward acceleration of the hip 3 from the hip vertical acceleration sensor 21, as with the first embodiment, it is sequentially monitored in each cycle time whether or not the elapsed time measured by the timing means 42 from the time of the start of the two-leg supporting state has reached an estimated value of the two-leg supporting period (the duration of the two-leg supporting state from the start to the end of the two-leg supporting state) which is determined, as described later, by the two-leg supporting period estimating means 44 at the time of the start of the two-leg supporting state. When the elapsed time has reached the estimated value of the two-leg supporting period, the leg motion determining means 25 judges that the two-leg supporting state is ended and the one-leg supporting state is started.

After the processing of the leg motion determining means 25 is thus executed and the processing of the leg posture calculating means 29 is executed in the same manner as with the first embodiment, the processing device 16 successively executes the processing of the traveling speed estimating means 43 and the processing of the two-leg supporting period estimating means 44.

Figure 13:
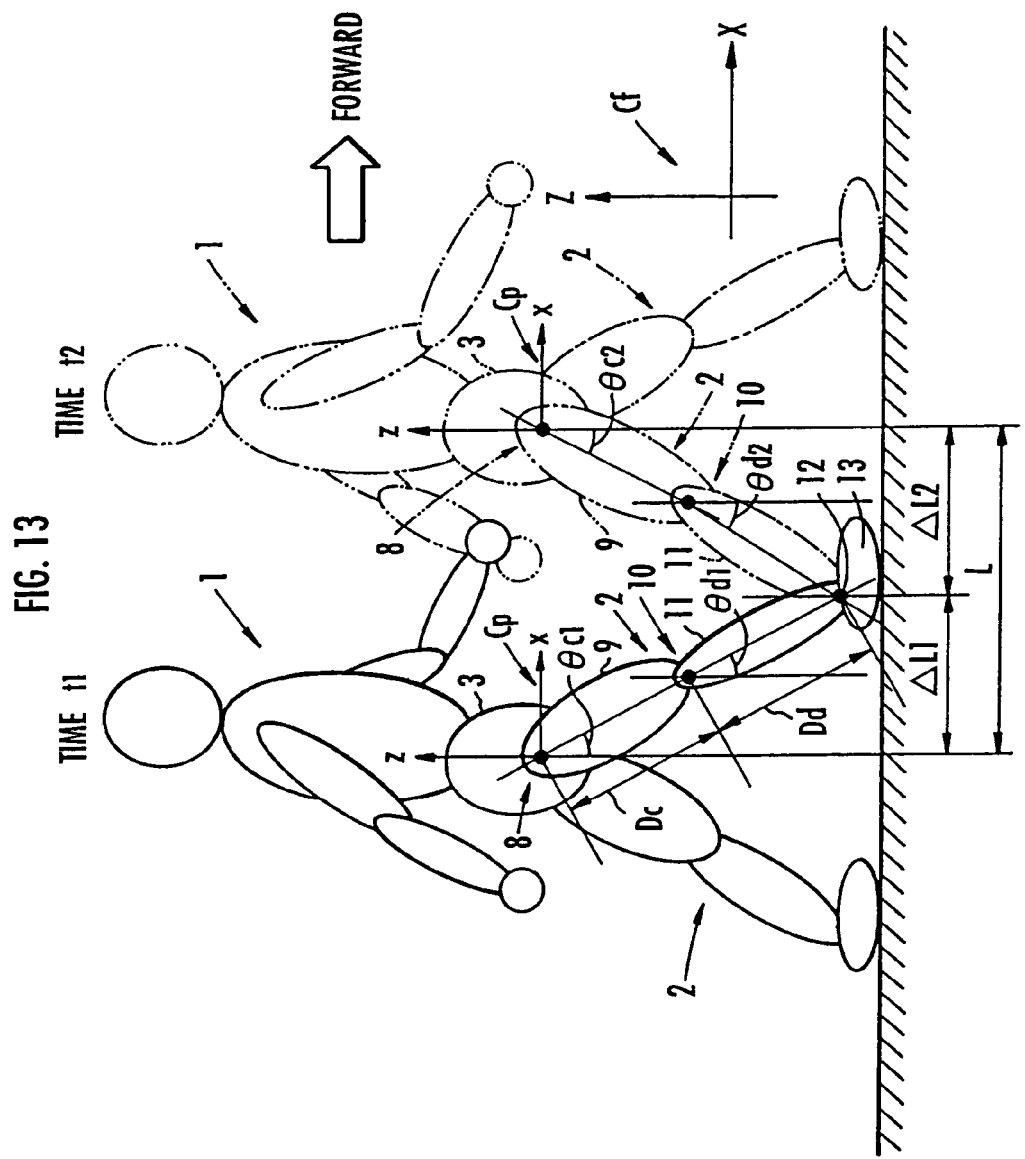
FIG. 13 is a view illustrative of the principles of estimating a moving speed.

The processing of the traveling speed estimating means 43 is performed as follows: As shown in FIG. 13, it is assumed that while the human being 1 is walking, the front leg 2 (the leg 2 on the right side of the human being 1 as it faces forward in FIG. 13) of the human being 1 indicated by the solid lines is landed on the floor, starting the two-leg supporting state at a time t1, and the next two-leg supporting state is started at a time t2 as indicated by the human being 1 shown by the imaginary lines (the rear leg 2 of the human being 1 is lifted off the floor at the time t1 and then landed on the floor at the time t2). At this time, a traveled distance L of the human being 1 from the time t1 to the time t2 is the distance which the center of the hip joint 8 of the hip 3 has traveled in the X-axis direction (the direction of travel of the human being 1) of the absolute coordinate system Cf (the distance is equal to the distance that the origin O of the body coordinate system Cp has traveled in the X-axis direction).

The traveled distance L is substantially in conformity with the sum of a distance $\Delta L1$ in the X-axis direction from the center of the hip joint 8 to the ankle 12 of the front leg 2 of the human being 1 at the time t1 and a distance $\Delta L2$ in the X-axis direction from the center of the hip joint 8 to the ankle 12 of the rear leg 2 (which was positioned forward of the human being 1 at the time t1) of the human being 1 at the time t2.

Therefore, by grasping the distances $\Delta L1$, $\Delta L2$ and the elapsed time (t2–t1) from the time t1 to the time t2, i.e., the elapsed time of one step after the two-leg supporting state is started until the next two-leg supporting state is started, a traveling speed V of the human being 1 from the time t1 to the time t2 (an average traveling speed from the time t1 to the time t2) can be determined according to the following equation (14) using the distances $\Delta L1$, $\Delta L2$ and the elapsed time (t2–t1) of one step:

$$V=L/(t2-t1)=(\Delta L1+\Delta L2)/(t2-t1) \tag{14}$$

In the processing of the traveling speed estimating means 43, each time the leg motion determining means 25 grasps that the two-leg supporting state is started, the distance $\Delta L1$ with respect to the front leg 2 and the distance $\Delta L2$ with respect to the rear leg 2 are determined in the manner described below, and the calculated values of the distances $\Delta L1$, $\Delta L2$ are stored. Then, the traveling speed V of the human being 1 is determined according to the equation (14) from the distance $\Delta L2$ with respect to the rear leg 2 which is determined when the present two-leg supporting state is started, the distance $\Delta L1$ with respect to the front leg 2 which was determined when the preceding two-leg supporting state was started, and the time (=t2–t2) measured by the timing means 42 from the start of the preceding two-leg supporting state to the start of the present two-leg supporting state.

The distances $\Delta L1$, $\Delta L2$ are determined as follows: With respect to the front leg 2 of the human being 1 at the start of the two-leg supporting state, the tilted angles of the thigh 9 and the lower thigh 11 which are determined by the leg posture calculating means 29 at the start of the two-leg supporting state (a cycle time in which the start of the two-leg supporting state is grasped by the leg motion determining means 25) are represented by $\theta c1$, $\theta d1$ (see the figure at the time t1 in FIG. 13), respectively. At this time, the distance $\Delta L1$ relative to the leg 2 is calculated according to the following equation (15) using the data of the tilted angles θc1, θd1 (θc1 >0, θd1>0) and the data of the respective lengths Dc, Dd of the thigh 9 and the lower thigh 11:

$$\Delta L1 = -Dc \cdot \sin\theta c1 + Dd \cdot \sin\theta d1 \qquad (15)$$

Similarly, with respect to the rear leg 2 of the human being 1 at the start of the two-leg supporting state, if the tilted angles of the thigh 9 and the lower thigh 11 which are determined by the leg posture calculating means 29 at the start of the two-leg supporting state are represented by θc2, θd2 (see the figure at the time t2 in FIG. 13), respectively, then the distance ΔL2 is calculated according to the following equation (16) using the data of the tilted angles θc2, θd2 (θc2 <0, θd2 <0) and the data of the respective lengths Dc, Dd of the thigh 9 and the lower thigh 11:

$$\Delta L2 = Dc \cdot \sin\theta c2 + Dd \cdot \sin\theta d2 \qquad (16)$$

According to the above processing of the traveling speed estimating means 43, each time the two-leg supporting state is started, the traveling speed V of the human being 1 (specifically, the traveling speed in a step immediately prior to the start of the two-leg supporting state) is estimated. In each cycle time in the period after the start of the two-leg supporting state until the start of the next two-leg supporting state, the estimated value of the traveling speed V is kept constant.

The processing of the two-leg supporting period estimating means 44 is performed as follows: According to the finding of the inventor of the present application, the two-leg supporting period which is the duration of the two-leg supporting state when the human being 1 walks is closely correlated to the traveling speed V of the human being 1. That is, the two-leg supporting period at the time the human being 1 walks varies with respect to the traveling speed V as shown in FIG. 14, and is shorter as the traveling speed V is higher.

Figure 14:
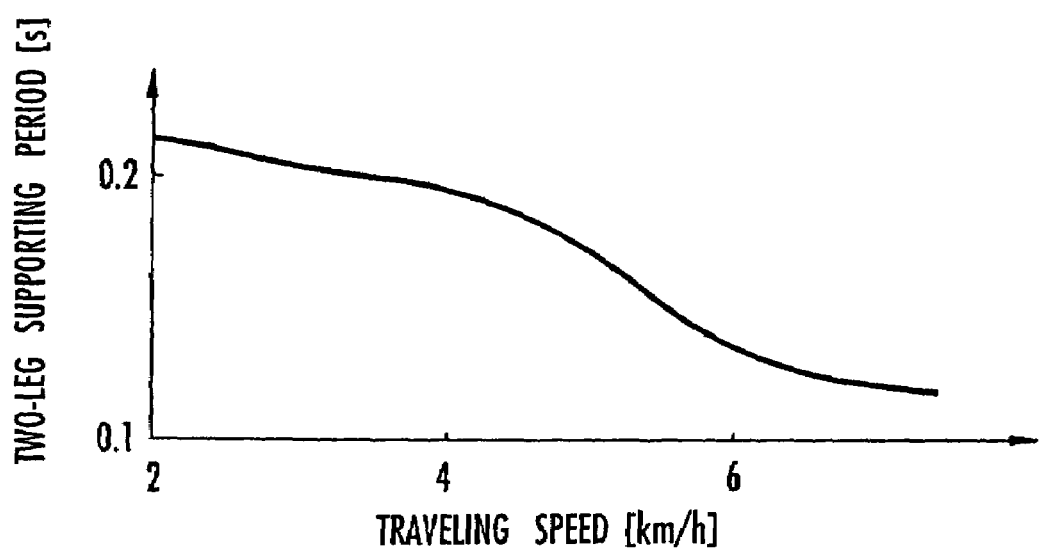
FIG. 14 is a diagram showing the correlation between the moving speed and a two-leg supporting period.

In the second embodiment, the correlation shown in FIG. 14 is stored in advance as a data table or a polynomial function approximating the correlation in the processing device 16. In the processing of the two-leg supporting period estimating means 44, when the two-leg supporting state is started, an estimated value of the two-leg supporting period with respect to the two-leg supporting state is determined based on the correlation data shown in FIG. 14 from the latest value of the traveling speed V which is determined by the traveling speed estimating means 36. The estimated value of the two-leg supporting period is maintained until the next two-leg supporting state is started.

In the processing of the floor reaction force estimating means 38, as with the first embodiment, an estimated value of the total floor reaction force $F = {}^T(Fx, Fz)$ is sequentially determined according to the following equation (2), using the data of the acceleration $^T(ax, az)$ of the body center G0 of gravity which is determined by the body center-of-gravity acceleration calculating means 34, and the data of the weight M of the human being 1. If the motion state of the legs 2 as grasped by the leg motion determining means 25 is the one-leg supporting state, then the estimated value of the total floor reaction force $F = {}^T(Fx, Fz)$ is directly determined as an estimated value of a total floor reaction force acting on the single leg 2 that is landed on the floor.

If the motion state of the legs 2 as grasped by the leg motion determining means 25 is the two-leg supporting state, then the floor reaction force estimating means 38 determines, as with the first embodiment, an estimated value of the vertical component Frz of the floor reaction force acting on the rear leg 2 based on the correlation shown in FIG. 6, using the MP height H, and subtracts Frz from the vertical component Fz of the total floor reaction force to determine an estimated value of the vertical component Ffz of the total floor reaction force acting on the front leg 2.

Estimated values of the components Ffx, Frx in the direction of travel of the floor reaction forces acting on the front and rear legs 2 are determined as follows: According to the finding of the inventor of the present application, if attention is directed to the relationship between the ratio of the component Frx in the direction of travel of the floor reaction force acting on the rear leg 2 in the two-leg supporting state to the component Fx in the direction of travel of the total floor reaction force at the start of the two-leg supporting state (hereinafter referred to as "floor reaction force ratio") and the ratio of the elapsed time from the start of the two-leg supporting state to the two-leg supporting period (=elapsed time/two-leg supporting period, hereinafter referred to as "two-leg supporting time ratio"), then there is a characteristic correlation between these ratios, and this characteristic correlation is essentially not affected by the traveling speed V of the human body 1.

Figure 15:
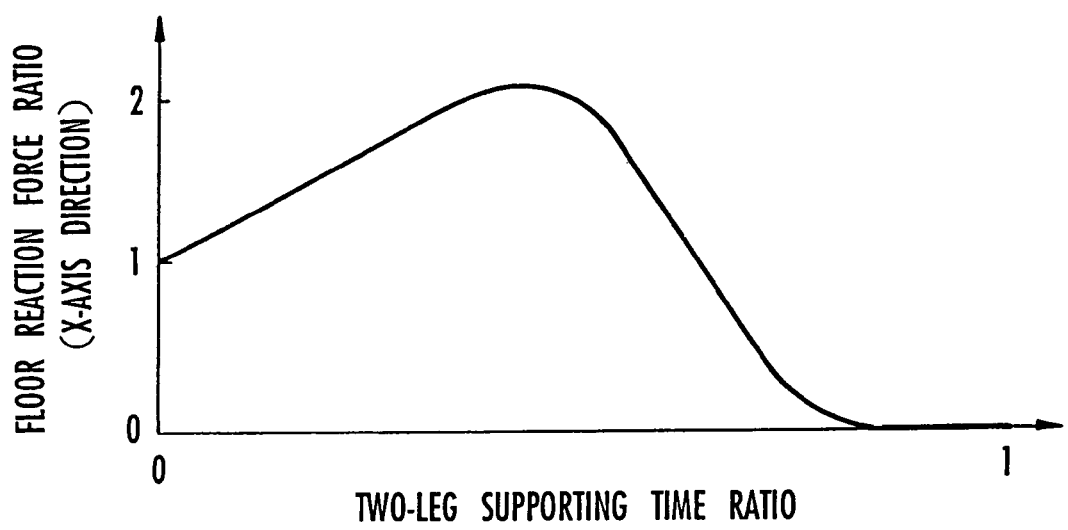
FIG. 15 is a diagram showing the correlation between a two-leg supporting time ratio and the component in the direction of travel of a floor reaction force acting on a rear leg.

Specifically, the floor reaction force ratio Frx/Fxs, which is the ratio of the component Frx in the direction of travel of the floor reaction force acting on the rear leg 2 to the component Fx (hereinafter represented by the reference characters Fxs) in the direction of travel of the total floor reaction force at the start of the two-leg supporting state, is not dependent on the traveling speed V of the human being 1, but has a substantially constant correlation with respect to the two-leg supporting time ratio as shown in FIG. 15. As the time of the two-leg supporting state elapses, the floor reaction force ratio Frx/Fxs increases from "1" and then decreases to "0".

In the second embodiment, the correlation data shown in FIG. 15 is stored in advance as a data table or a polynomial function approximating the correlation data in the processing device 16. The two-leg supporting time ratio is sequentially determined in each cycle time from the current time value of the timed data of the elapsed time from the timing means 42 and the latest value of the data of the estimated value of the two-leg supporting period which is determined by the two-leg supporting period estimating means 44. The floor reaction force ratio Frx/Fxs is sequentially determined based on the correlation data shown in FIG. 15 from the data of the determined two-leg supporting time ratio. The floor reaction force ratio Frx/Fxs is then multiplied by the component Fxs in the direction of travel of the total floor reaction force at the start of the two-leg supporting state, determining an estimated value of the component Frx in the direction of travel of the floor reaction force acting on the rear leg 2. The component Frx is then subtracted from the component Fx in the direction of travel of the total floor reaction force, thereby determining an estimated value of the component Ffx in the direction of travel of the floor reaction force acting on the front leg 2.

After the floor reaction forces $Fr = {}^T(Frx, Frz)$, $Ff = {}^T(Ffx, Ffz)$ acting on the respective legs 2 are thus determined, moments acting on the knee joint 10 and the hip joint 8 of each leg 2 are estimated sequentially in real-time as with the first embodiment by the processing of the joint moment estimating means 39.

In the second embodiment, the two-leg supporting period is determined from the estimated value of the traveling speed V, and the floor reaction force ratio corresponding to the component in the direction of travel of the floor reaction force acting on the rear leg 2 is determined based on the two-leg supporting period and the elapsed time of the two-leg supporting state, and then Frx is determined. However, the floor reaction force ratio may be determined directly from the traveling speed and the elapsed time of the two-leg supporting state, using a map or the like.

Instead of the process of estimating the components Ffx, Frx in the direction of travel of the floor reaction forces as described above in the first and second embodiments, a uniaxial force sensor having a detecting direction as the X-axis direction may be installed on footwear or the like, and the components Ffx, Frx in the direction of travel of the floor reaction forces acting on the front and rear legs 2 in the two-leg supporting state may be measured by such a force sensor.

The traveling speed V used in the second embodiment may be estimated by integrating the horizontal acceleration of the body center G0 of gravity which is determined by the body center-of-gravity acceleration calculating means 34 as described above.

In the first and second embodiments, the acceleration sensor is used to determined the MP height H. However, the MP height H may be measured by an optical distance measuring means using an LED or the like.

Industrial Applicability:

As described above, the present invention is capable of estimating floor reaction forces acting on the legs of a bipedal movable body with relatively small and lightweight sensors, and is useful as easily applicable to an apparatus for assisting a human being to walk and the control of a bipedal walking robot.

The invention claimed is:

1. A method of estimating a floor reaction force including a vertical component of a floor reaction force acting on each leg of a bipedal movable body while the bipedal movable body is in a two-leg supporting state in which both legs of the bipedal movable body are landed on a floor, comprising:
   a first step of sequentially determining the position of a center of gravity of said bipedal movable body and sequentially determining an acceleration of the center of gravity in an absolute coordinate system fixed with respect to the floor using time-series data of the position of the center of gravity;
   a second step of sequentially determining an estimated value of a total floor reaction force based on a motion equation of the center of gravity which is expressed by the weight of said bipedal movable body, the gravitational acceleration, an acceleration of said center of gravity, and the total floor reaction force which is a combination of floor reaction forces acting on the legs; and
   a third step of sequentially determining the position, from a surface of the floor, of a predetermined particular region of a foot of at least a front one of the legs which is positioned forward in the direction of travel of said bipedal movable body in said two-leg supporting state;
   wherein when said bipedal movable body is in said two-leg supporting state, an estimated value of the vertical component of a floor reaction force acting on a rear leg is sequentially determined using the position, determined in the third step, from the surface of the floor, of the predetermined particular region of the foot of the front leg, based on a predetermined correlation between the vertical component of the floor reaction force acting on a rear one of the legs which is positioned rearward in the direction of travel of said bipedal movable body, and the position, from the surface of the floor, of the particular region of the foot of the front leg, and the determined estimated value of the vertical component of the floor reaction force acting on the rear leg is subtracted from the estimated value, determined in said second step, of the vertical component of the total floor reaction force to sequentially determine an estimated value of the vertical component of the floor reaction force acting on the front leg.

2. A method of estimating a floor reaction force on the bipedal movable body according to claim 1, wherein said particular region of said foot comprises a metatarsophalangeal joint.

3. A method of estimating a floor reaction force on the bipedal movable body according to claim 1, further comprising the step of sequentially determining an estimated value of a horizontal component of the floor reaction force acting on each of the legs based on a motion equation of said center of gravity and a relational expression between the position of a predetermined second particular region of a lower portion of each of the legs with respect to the center of gravity and the floor reaction force acting on each of the legs, which relational expression is determined on the assumption that the floor reaction force acting on each of the legs acts from said second particular region toward said center of gravity, when said bipedal movable body is in said two-leg supporting state.

4. A method of estimating a floor reaction force on the bipedal movable body according to claim 3, wherein said second particular region comprises an ankle of each of the legs.

5. A method of estimating a floor reaction force on the bipedal movable body according to claim 1, further comprising the step of sequentially determining an estimated value of a horizontal component of the floor reaction force acting on said rear leg based on the horizontal component of the floor reaction force acting on said rear leg and a predetermined correlation between an elapsed time from the start of said two-leg supporting state and a traveling speed of said bipedal movable body, and the step of subtracting the determined estimated value of the horizontal component of the floor reaction force acting on said rear leg from an estimated value of a horizontal component of the total floor reaction force determined in said second step thereby to determine an estimated value of the horizontal component of the floor reaction force acting on the front leg.

* * * * *